United States Patent
Takahashi et al.

(10) Patent No.: US 9,043,116 B2
(45) Date of Patent: May 26, 2015

(54) METHOD AND APPARATUS FOR PERFORMING DRIVING ASSISTANCE

(71) Applicant: Hitachi, Ltd., Chiyoda-ku, Tokyo (JP)

(72) Inventors: Junya Takahashi, Munich (DE); Heiko Altmannshofer, Tann (DE); Makoto Yamakado, Tokyo (JP); Takao Kojima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/166,966

(22) Filed: Jan. 29, 2014

(65) Prior Publication Data
US 2015/0094927 A1 Apr. 2, 2015

(30) Foreign Application Priority Data
Sep. 30, 2013 (EP) .................................... 13186774

(51) Int. Cl.
| | | |
|---|---|---|
| *B60T 8/32* | (2006.01) | |
| *B60W 30/14* | (2006.01) | |
| *G05D 13/02* | (2006.01) | |

(52) U.S. Cl.
CPC ............. *B60W 30/143* (2013.01); *G05D 13/02* (2013.01)

(58) Field of Classification Search
CPC ................. B60W 2550/146; B60W 2720/106; B60W 30/18145; B60W 2550/402; B60W 30/143; B60W 50/0097; B60W 30/045; B60W 10/04; B60W 10/08; B60W 10/119; B60W 10/18; B60W 10/184; B60W 2520/125
USPC ................................................ 701/70, 74, 93
See application file for complete search history.

(56) References Cited

U.S. PATENT DOCUMENTS

| 8,433,493 | B2* | 4/2013 | Takahashi et al. ............... 701/70 |
| 2012/0179349 | A1* | 7/2012 | Yamakado et al. .............. 701/89 |
| 2012/0209489 | A1* | 8/2012 | Saito et al. ...................... 701/70 |
| 2013/0131947 | A1* | 5/2013 | Takahashi et al. ............... 701/70 |

FOREIGN PATENT DOCUMENTS

| EP | 1 992 537 A2 | 11/2008 |
| JP | 2010-260544 A | 11/2010 |
| JP | 2011-73534 A | 4/2011 |
| JP | 2011-88576 A | 5/2011 |
| JP | 2012-30674 A | 2/2012 |
| JP | 2012-210935 A | 11/2012 |
| JP | 2013-14202 A | 1/2013 |

OTHER PUBLICATIONS

Takahashi et al., "Development of an Adaptive Longitudinal Control System with Predicted Lateral Motion Information," Aachen Colloquium Automobile and Engine Technology, 2013, pp. 767-790, vol. 22.

* cited by examiner

*Primary Examiner* — Redhwan K Mawari
(74) *Attorney, Agent, or Firm* — Crowell & Moring LLP

(57) ABSTRACT

The present invention relates to methods and apparatuses for performing driving assistance for a controlled vehicle, involving determining a first longitudinal acceleration target value on the basis of a lateral acceleration of the controlled vehicle, determining a second longitudinal acceleration target value on the basis of a target speed of the controlled vehicle, determining a third longitudinal acceleration target value based on a minimum value of the first longitudinal acceleration target value and the second longitudinal acceleration target value, and controlling a longitudinal acceleration of the controlled vehicle on the basis of the determined third longitudinal acceleration target value.

15 Claims, 14 Drawing Sheets

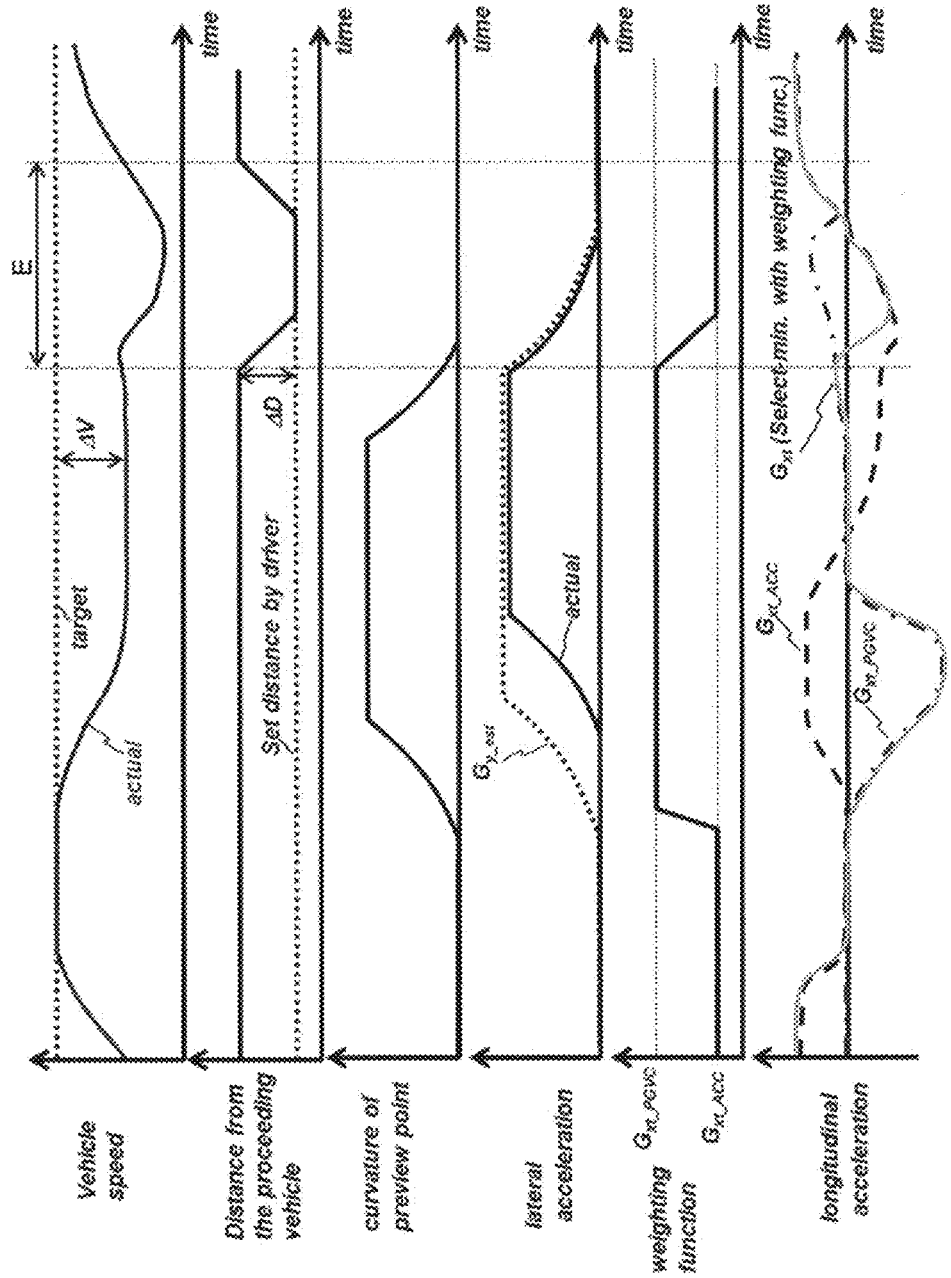

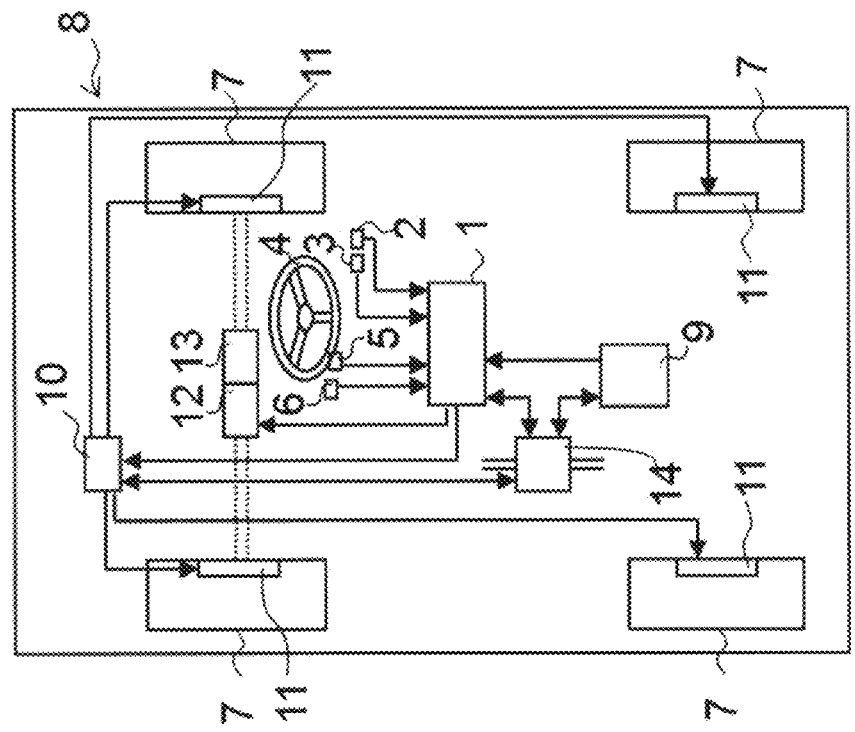

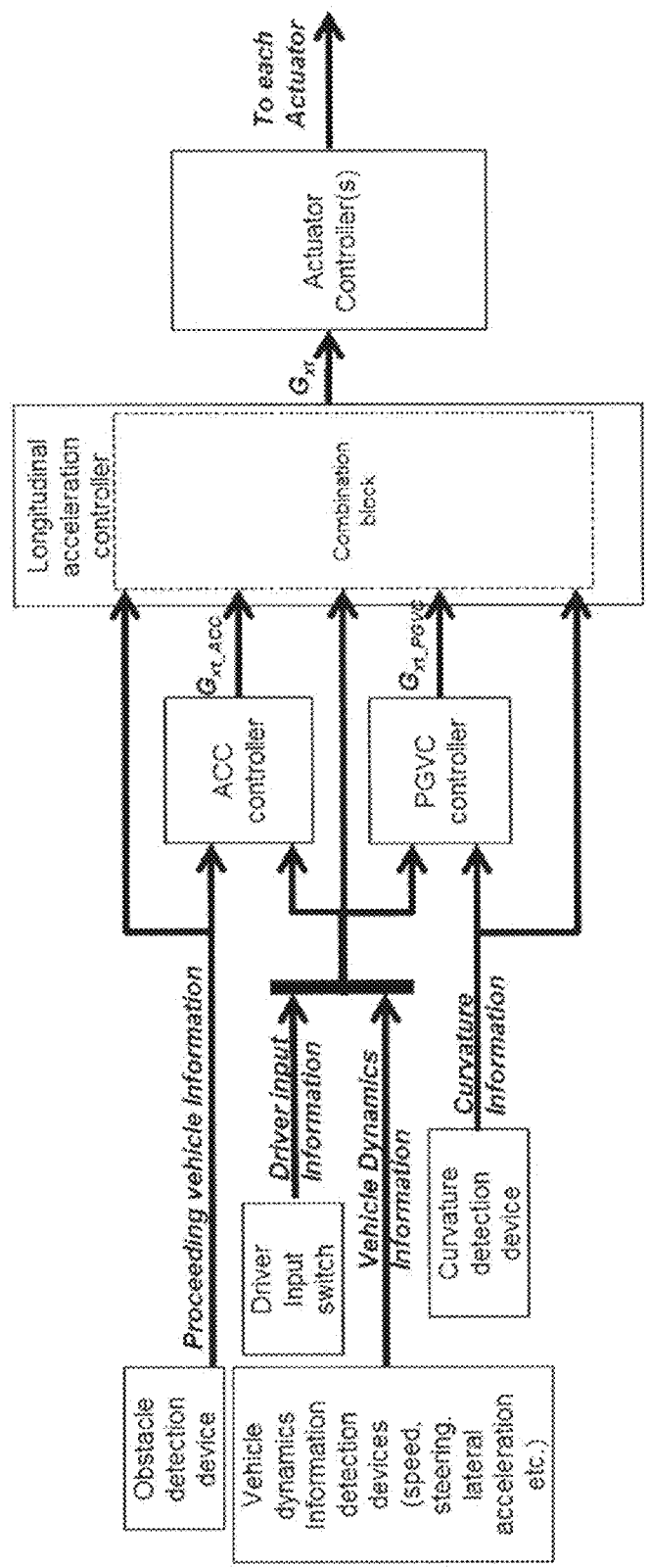

METHOD AND APPARATUS FOR PERFORMING DRIVING ASSISTANCE

BACKGROUND

The present invention relates to a method and an apparatus for performing driving assistance for a vehicle.

In the prior art of performing driving assistance for a vehicle, there are known the concepts of so-called Electronic Stability Control (ESC), also referred to as Electronic Stability Program (ESP) or Dynamic Stability Control (DSC), which is a computer-implemented control technology for improving the safety of a vehicle's stability by detecting and reducing loss of traction, wherein the control target is the yaw moment of the vehicle.

Other control concepts for performing driving assistance for a vehicle such as so-called cruise control (CC) and adaptive cruise control (ACC) are known. According to cruise control (CC), the longitudinal acceleration of a controlled vehicle is controlled based on a comparison of a user-set target speed and a current speed of the controlled vehicle. If the current speed is lower than the user-set target speed, the controlled vehicle will be positively accelerated until the current speed matches the user-set target speed, and if the current speed is larger than the user-set target speed, the controlled vehicle will be decelerated until the current speed matches the user-set target speed.

According to adaptive cruise control (ACC), the vehicle will be controlled similar to the above-described cruise control (CC) but, in addition, as soon as and as long as it is determined that a distance to a proceeding vehicle is equal or lower than a user-set or pre-set target distance, the longitudinal acceleration of the controlled vehicle will be controlled such as to keep the target distance to the proceeding vehicle at least as long as the proceeding vehicle is traveling at a speed equal to or lower than the target speed.

Recently, according to EP 1 992 537 A2, another concept for performing driving assistance for a vehicle was proposed, which concept (referred to as e.g. G-Vectoring Control, GVC) can be provided alternatively or also additionally to the above-mentioned Electronic Stability Control (ESC), in which the control target is the longitudinal acceleration of the vehicle and the control is based on a lateral acceleration and lateral Jerk of the vehicle. The longitudinal control concept of GVC may be extended as Preview G-Vectoring Control (PGVC) by using a predicted lateral acceleration and lateral jerk of the vehicle.

Specifically, according to a control concept, a lateral acceleration of the vehicle, which is an acceleration of the vehicle in a lateral direction perpendicular to a longitudinal direction of the vehicle corresponding to a moving direction of the vehicle, and a lateral jerk of the vehicle, which is a jerk of the vehicle in the lateral direction, are determined. Based on the determined lateral acceleration and lateral jerk, a longitudinal acceleration of the vehicle is controlled.

While the principle concept of control of longitudinal acceleration of the vehicle and the to control on the basis of lateral jerk has been developed, it is desirable to modify and develop further the control concept of EP 1 992 537 A2 for providing improved safety and higher driver's comfort and convenience, and in particular for providing improved vehicle handling and cornering behavior.

SUMMARY OF THE INVENTION

In view of the above object, there is proposed a method for performing driving assistance for a vehicle and an apparatus for performing driving assistance for a vehicle according to the present invention. Further, a computer program product is proposed.

According to a general aspect of the present invention, there may be provided a method or apparatus for performing driving assistance for a vehicle in which a lateral acceleration and a lateral jerk of the moving vehicle or at least parameters indicative of the lateral acceleration and the lateral jerk of the moving vehicle are determined, in particular regularly determined or even continuously monitored, and a longitudinal acceleration of the moving vehicle may then be controlled either on the basis of the determined lateral acceleration and lateral jerk or according to cruise control or adaptive cruise control.

Also, in addition or as an alternative there may be provided a method or apparatus for performing driving assistance for a vehicle in which a lateral acceleration and a lateral jerk of the moving vehicle or at least parameters indicative of the lateral acceleration and the lateral jerk of the moving vehicle are predicted (estimated) in advance based on a vehicle speed of the controlled vehicle and on the basis of curvature information such as a curvature of a curve of the road ahead of the controlled vehicle, e.g. at a preview point, in particular regularly predicted (estimated) or even continuously predicted (estimated), and a longitudinal acceleration of the moving vehicle may then be controlled on the basis of the predicted (estimated) lateral acceleration and lateral jerk, e.g. on the basis of a time derivative of the curvature of a curve of the road ahead of the controlled vehicle and the vehicle speed of the controlled vehicle, or according to cruise control or adaptive cruise control.

In the above, a decision whether the longitudinal direction of the controlled vehicle is controlled according to a target longitudinal acceleration control value of cruise control/adaptive cruise control or on the basis of another target longitudinal acceleration control value determined based on determined or predicted (estimated) lateral acceleration and/or lateral jerk may be made based on a comparison of the independently determined target longitudinal acceleration control values, in particular by taking the minimum value of the compared target longitudinal acceleration control values.

This has the advantage that different control algorithms can be combined in an easy and efficient manner, in that the respective target longitudinal acceleration control values can be independently determined by the different control algorithms. Then the target longitudinal acceleration control value being the smaller value of the compared target longitudinal acceleration control values is actually output by the controller to actuators of the vehicle so as to control the longitudinal acceleration of the vehicle based on the output target longitudinal acceleration control value.

This further provides the advantage that the combination of control algorithms provides high driving safety because for safety reasons always the smaller target longitudinal acceleration control value of the two (or more) compared target longitudinal acceleration control values is output That is, in case both target longitudinal acceleration control values are positive, the smaller target longitudinal acceleration control value is used, thereby leading to a smaller positive longitudinal acceleration of the vehicle, i.e. to a less strong acceleration. On the other hand, in case both target longitudinal acceleration control values are negative, the smaller target longitudinal acceleration control value (i.e. the larger negative value) is used, thereby leading to a larger longitudinal deceleration of the vehicle, i.e. to a stronger deceleration. Finally, if one target longitudinal acceleration control value is positive and one target longitudinal acceleration control value is negative, the negative target longitudinal acceleration control value will be used, thereby prioritizing the command to decelerate over the concurring command to accelerate. Accordingly, high safety of the driving performance according to the control algorithm can be maintained.

In summary, according to a first aspect of the invention, there is proposed a method for performing driving assistance for a controlled vehicle moving in a longitudinal direction on a road, comprising determining a first longitudinal acceleration target value on the basis of a lateral acceleration of the controlled vehicle (e.g. an actual current lateral acceleration of the vehicle, such as in GVC, or a predicted/estimated lateral acceleration of the controlled vehicle which will act on the controlled vehicle at a preview point ahead of the current position of the controlled vehicle), determining a second longitudinal acceleration target value on the basis of a target speed of the controlled vehicle, determining a third longitudinal acceleration target value based on a minimum value of the first longitudinal acceleration target value and the second longitudinal acceleration target value, and controlling a longitudinal acceleration of the controlled vehicle on the basis of the determined third longitudinal acceleration target value.

According to a preferred aspect, the second longitudinal acceleration target value may be to determined according to cruise control on the basis of the target speed of the controlled vehicle, or the second longitudinal acceleration target value may be determined according to adaptive cruise control on the basis of the target speed of the controlled vehicle and on the basis of a target distance from the controlled vehicle to a proceeding vehicle.

According to another preferred aspect, the step of determining the first longitudinal acceleration target value may comprise a step of determining a fourth longitudinal acceleration target value on the basis of a lateral acceleration of the controlled vehicle and a step of adjusting the fourth longitudinal acceleration target value.

Preferably, the step of adjusting the fourth longitudinal acceleration target value may be performed on the basis of at least one of a difference between an actual speed of the controlled vehicle and the target speed of the controlled vehicle, a difference between an actual distance from the controlled vehicle to a proceeding vehicle and a target distance from the controlled vehicle to the proceeding vehicle, a difference between a speed of the controlled vehicle and a speed of the proceeding vehicle, and an estimated lateral acceleration of the controlled vehicle at a preview point of the road ahead of the controlled vehicle, the estimated lateral acceleration being calculated on the basis of an estimation (prediction) of curvature of the road at the preview point and/or a curvature of the road at controlled vehicle, and the current speed of the controlled vehicle.

In some scenarios, it may be preferable that the control of the longitudinal acceleration on the basis of a lateral acceleration of the controlled vehicle is prioritized over the longitudinal acceleration control on the basis of a target speed of the controlled vehicle and/or the target distance to a proceeding vehicle. Such scenarios may be determined according to different conditions such as conditions on the difference between an actual speed of the controlled vehicle and the target speed of the controlled vehicle, a difference between an actual distance from the controlled vehicle to a proceeding vehicle and a target distance from the controlled vehicle to the proceeding vehicle, a difference between a speed of the controlled vehicle and a speed of the proceeding vehicle, and/or an estimated lateral acceleration of the controlled vehicle at a preview point of the road ahead of the controlled vehicle.

The above aspect has the advantage that the underlying longitudinal acceleration target value can be appropriately adjusted prior to the comparison to the other longitudinal acceleration target value in order to be able to prioritize the longitudinal acceleration on the basis of a lateral acceleration of the controlled vehicle depending on the conditions.

Preferably, the step of adjusting the fourth longitudinal acceleration target value may be performed based on a first weighting factor being determined from a weighting function depending to on at least one of the difference between the actual speed of the controlled vehicle and the target speed of the controlled vehicle, the difference between the actual distance from the controlled vehicle to the proceeding vehicle and the target distance from the controlled vehicle to the proceeding vehicle, the difference between the speed of the controlled vehicle and the speed of the proceeding vehicle, and the estimated lateral acceleration of the controlled vehicle at the preview point of the road ahead of the controlled vehicle.

In an alternative preferred aspect, the step of adjusting the fourth longitudinal acceleration target value may be performed based on a first weighting factor being determined from at least one of a first weighting function depending on the difference between the actual speed of the controlled vehicle and the target speed of the controlled vehicle, a second weighting function depending on the difference between the actual distance from the controlled vehicle to the proceeding vehicle and the target distance from the controlled vehicle to the proceeding vehicle, a third weighting function depending on the difference between the speed of the controlled vehicle and the speed of the proceeding vehicle, and a fourth weighting function depending on the estimated lateral acceleration of the controlled vehicle at the preview point of the road ahead of the controlled vehicle.

According to another preferred aspect, the step of determining the second longitudinal acceleration target value may comprise a step of determining a fifth longitudinal acceleration target value on the basis of the target speed of the controlled vehicle and a step of adjusting the fifth longitudinal acceleration target value.

Preferably, the step of adjusting the fifth longitudinal acceleration target value may be performed on the basis of at least one of a difference between an actual speed of the controlled vehicle and the target speed of the controlled vehicle, a difference between an actual distance from the controlled vehicle to a proceeding vehicle and a target distance from the controlled vehicle to the proceeding vehicle, a difference between a speed of the controlled vehicle and a speed of the proceeding vehicle, and an estimated lateral acceleration of the controlled vehicle at a preview point of the road ahead of the controlled vehicle, the estimated lateral acceleration being calculated on the basis of an estimation of curvature of the road at the preview point and the current speed of the controlled vehicle.

In some scenarios, it may be preferable that the control of the longitudinal acceleration on the basis of a target speed of the controlled vehicle and/or a target distance to a proceeding vehicle is prioritized over the longitudinal acceleration control on the basis of a lateral acceleration of the controlled vehicle. Such scenarios may also be determined according to different conditions such as conditions on the difference between an actual speed of the controlled vehicle and the target speed of the controlled vehicle, a difference between an actual distance from the controlled vehicle to a to proceeding vehicle and a target distance from the controlled vehicle to the proceeding vehicle, a difference between a speed of the controlled vehicle and a speed of the proceeding vehicle, and/or an estimated lateral acceleration of the controlled vehicle at a preview point of the road ahead of the controlled vehicle.

The above aspect has the advantage that the underlying longitudinal acceleration target value can be appropriately adjusted prior to the comparison to the other longitudinal acceleration target value in order to be able to prioritize the longitudinal acceleration on the basis of a target speed of the controlled vehicle and/or a target distance to a proceeding vehicle depending on the conditions.

Preferably, the step of adjusting the fifth longitudinal acceleration target value may be performed based on a second weighting factor being determined from a weighting function depending on at least one of the difference between the actual speed of the controlled vehicle and the target speed of the controlled vehicle, the difference between the actual distance from the controlled vehicle to the proceeding vehicle and the target distance from the controlled vehicle to the proceeding vehicle, the difference between the speed of the controlled vehicle and the speed of the proceeding vehicle, and the estimated lateral acceleration of the controlled vehicle at the preview point of the road ahead of the controlled vehicle.

In an alternative preferred aspect, the step of adjusting the fifth longitudinal acceleration target value may be performed based on a second weighting factor being determined from at least one of a first weighting function depending on the difference between the actual speed of the controlled vehicle and the target speed of the controlled vehicle, a second weighting function depending on the difference between the actual distance from the controlled vehicle to the proceeding vehicle and the target distance from the controlled vehicle to the proceeding vehicle, a third weighting function depending on the difference between the speed of the controlled vehicle and the speed of the proceeding vehicle, and a fourth weighting function depending on the estimated lateral acceleration of the controlled vehicle at the preview point of the road ahead of the controlled vehicle.

In further preferred aspects, the first and second weighting factors mentioned above may be determined from the same weighting functions such that the sum of the first and second weighting factors amounts to 1.

In further preferred aspects, the step of adjusting the fourth longitudinal acceleration target value may be performed such that the first longitudinal acceleration target value may be determined as the fourth longitudinal acceleration target value, if the fourth longitudinal acceleration target value is smaller than zero, and the first longitudinal acceleration target value may be determined by subtracting, from the fourth longitudinal acceleration target value, the product of the first weighting factor and the difference between the fourth longitudinal acceleration target value and the fifth longitudinal acceleration target value, if the fourth longitudinal acceleration target value is equal to or larger than zero.

In further preferred aspects, the step of adjusting the fifth longitudinal acceleration target value may be performed such that the second longitudinal acceleration target value is determined as the fifth longitudinal acceleration target value, if the fifth longitudinal acceleration target value is larger than the fourth longitudinal acceleration target value, and the second longitudinal acceleration target value may be determined by adding, to the fifth longitudinal acceleration target value, the product of the second weighting factor and the difference between the fourth longitudinal acceleration target value and the fifth longitudinal acceleration target value, if the fifth longitudinal acceleration target value is equal to or smaller than the fourth longitudinal acceleration target value.

In another preferred aspect, the step of determining the first longitudinal acceleration target value may further comprise a step of determining a sixth longitudinal acceleration target value being calculated on the basis of a determined lateral acceleration and a corresponding lateral jerk of the vehicle during cornering.

In another preferred aspect, the step of determining the first longitudinal acceleration target value may further comprise a step of determining a seventh longitudinal acceleration target value being calculated on the basis of an estimated lateral acceleration of the vehicle at a preview point, which is located ahead of the controlled vehicle at a predetermined preview distance or at a preview distance which is calculated on the basis of a predetermined preview time and the current speed of the vehicle, the estimated lateral acceleration at a preview point being calculated on the basis of an estimation of curvature of the road at the preview point and the current speed of the controlled vehicle.

In the above preferred aspects, the first longitudinal acceleration target value is preferably determined based on the sixth longitudinal acceleration target value and the seventh longitudinal acceleration target value.

According to a second aspect of the present invention, there is proposed an apparatus (such as a control unit or control system integrated in or mountable to a vehicle) for performing driving assistance for a controlled vehicle moving in a longitudinal direction on a road according to a method as described in any one of the above first aspect and preferred aspects thereof.

The apparatus may comprise first longitudinal acceleration target value determining means for determining a first longitudinal acceleration target value on the basis of a lateral acceleration of the controlled vehicle, second longitudinal acceleration target value determining means for determining a second longitudinal acceleration target value on the basis of a target speed of the controlled vehicle, third longitudinal acceleration target value determining means for determining a third longitudinal acceleration target value based on a minimum value of the first longitudinal acceleration target value and the second longitudinal acceleration target value, and longitudinal acceleration control means for controlling a longitudinal acceleration of the controlled vehicle on the basis of the determined third longitudinal acceleration target value.

According to a third aspect of the present invention, there is proposed program product comprising computer program means for causing a vehicle control apparatus to execute the steps of a method as described in any one of the above first aspect and preferred aspects thereof.

In the above, the term "acceleration" may refer to a derivative of speed (or velocity) with respect to time and the term jerk refers to a derivative of acceleration with respect to time, or to a second derivative of speed (or velocity) with respect to time. Typically, if not stated otherwise, the term "acceleration" as used in the present disclosure may include positive acceleration (i.e. increasing speed) as well as negative acceleration (i.e. deceleration or reducing speed).

A lateral direction of the vehicle can also be referred to as a direction of the pitch axis of the vehicle and a longitudinal direction of the vehicle can be referred to as a direction of the roll axis of the vehicle.

Moreover, while velocity, acceleration and Jerk are in general vector quantities, terms such as lateral acceleration, longitudinal acceleration, and lateral jerk are typically referring to scalar quantities.

In a Cartesian coordinate system of the vehicle having the yaw, pitch and roll axes as principal axes of the coordinate system, a lateral acceleration refers to the pitch axis coordinate of the acceleration vector and a longitudinal acceleration refers to the roll axis coordinate of the acceleration vector. Similarly, a lateral jerk refers to the pitch axis coordinate of the jerk vector.

In the driving control, while the longitudinal acceleration may preferably need to discriminate between positive acceleration (acceleration of the vehicle in the sense of increasing speed) and negative acceleration (deceleration) of the vehicle in the sense of decreasing speed and/or braking, the lateral acceleration does not necessarily need to discriminate between positive lateral acceleration (i.e. acceleration towards the left/right) and negative lateral acceleration (i.e. acceleration towards the right/left) since driving control should preferably be performed similar for left turn and right turn driving.

Therefore, a lateral acceleration may similarly refer to the absolute value of the pitch axis coordinate of the acceleration vector, however, then a lateral jerk may preferably refer to the derivative of the absolute value of the lateral acceleration with respect to time. On the other hand, a lateral jerk preferably again may preferably need to discriminate between positive jerk (i.e. increasing lateral acceleration) and negative Jerk (i.e. decreasing lateral acceleration).

BRIEF DESCRIPTION OF FIGURES

FIG. 13 exemplarily shows an illustration of the longitudinal-acceleration control with a proceeding vehicle.

FIG. 14 exemplarily shows a control system outline to control the longitudinal acceleration by ACC combined with PGVC.

FIG. 15 exemplarily shows a schematic block diagram of a controller system according to another embodiment of the present invention.

DETAILED DESCRIPTION OF FIGURES AND PREFERRED EMBODIMENTS OF THE PRESENT INVENTION

Preferred embodiments of the present invention will be described below with reference to the accompanying figures. The described features and aspects of the embodiments may be modified or combined to form further embodiments of the present invention.

In these figures, exemplarily, a combination of Preview G-Vectoring Control (PGVC) and Adaptive Cruise Control (ACC), which controls the longitudinal-acceleration to keep a constant speed and a safe time gap to the proceeding vehicle, is explained in connection with an exemplary embodiment. However, Cruise Control (CC) is one of the functions of ACC and other exemplary cases of combining PGVC with CC instead of ACC is deemed to be included in this disclosure. Specifically, a combination of control algorithms as discussed in the exemplary embodiment below, as applied to combining PGVC and ACC control algorithms, can be applied also to combinations of any of PGVC and GVC (G-Vectoring Control) with any of CC and ACC. Also, more than two control algorithms can be combined.

Cruise Control (CC) is the one of the functions to reduce the driver's pedal works during driving. CC is useful to keep the constant speed. However, it is difficult to use CC on a winding road driving because, normally. CC does not work well to accelerate/decelerate during cornering.

In order to extend CC for convenient and safe use on a winding road, the independent longitudinal-acceleration control for cornering (Preview G-Vectoring Control: PGVC) can be combined with CC by using a combination block (as a longitudinal acceleration target value determining means in a controller) based on a select-minimum method and optionally also one or more weighting functions so as to conveniently give a priority to PGVC acceleration control during cornering. Furthermore, this structure makes easy to replace/add/remove the functions (e.g. CC to Adaptive Cruise Control: ACC) and the select-minimum method and weighting function in the combination block makes it simple with safety and comfort.

Figure 1:
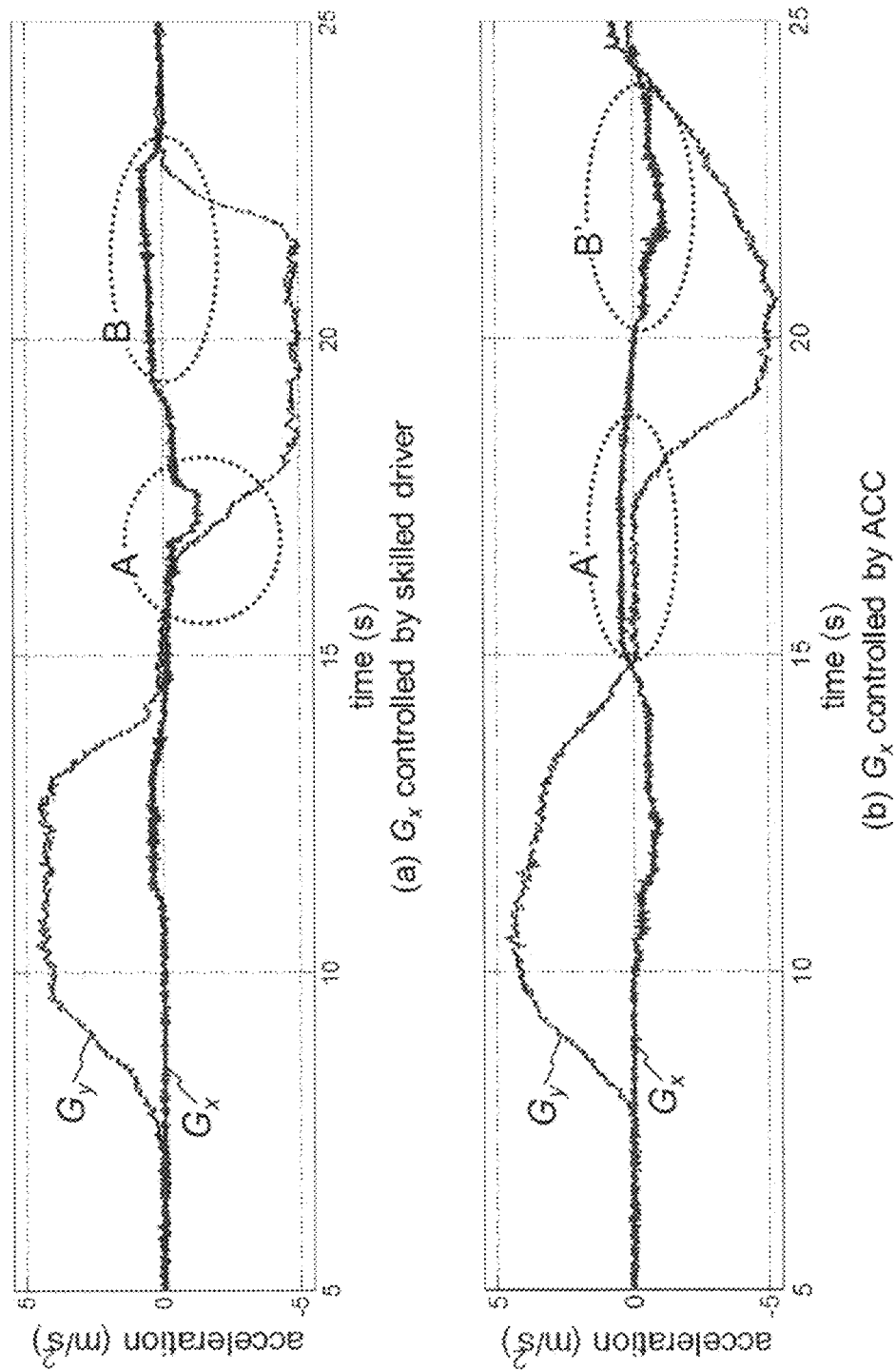
FIG. 1 exemplarily shows a time diagram of the longitudinal-acceleration ($G_x$) and lateral-acceleration ($G_y$) during driving on a winding road ((a) $G_x$ controlled by skilled driver, (b) $G_x$ controlled by ACC).

FIG. 1 exemplarily shows the change of a longitudinal-acceleration $G_x$ of the controlled vehicle (solid line) and lateral-acceleration $G_Y$ of the controlled vehicle (dotted line) during driving on a winding road. Longitudinal-acceleration $G_x$ shown in FIG. 1 (a) is controlled by a skilled driver (without any automatic control) and in FIG. 1 (b) the a longitudinal-acceleration $G_x$ of the controlled vehicle is controlled by ACC.

In both cases, maximum lateral-acceleration peaks are almost the same (around 5 m/s2), but the changes of longitudinal-acceleration are completely different. The skilled driver decelerated the vehicle after the absolute value of lateral-acceleration increases (FIG. 1 (a), section A) and started acceleration closing to the end of cornering (FIG. 1 (a), section B). However, the control according to ACC did not decelerate the vehicle at the beginning of cornering (FIG. 1 (b), section A') and started deceleration during cornering (FIG. 1 (b), section B'). These differences of longitudinal-acceleration will cause the discomfort to the driver during cornering, when this ACC control system activates.

In order to extend the function of ACC to use in winding road driving, exemplarily, an additional longitudinal-acceleration control algorithm according to GVC or PGVC is proposed, using curvature information.

As the longitudinal-acceleration control based on a lateral motion, longitudinal-acceleration using lateral jerk called "G-Vectoring Control" (GVC) is available. As a fundamental equation defining GVC, the following equation can be used:

$$G_{xt\_GVC} = -\text{sgn}(G_y \cdot \dot{G}_y) \frac{C_{xy}}{1 + Ts} |\dot{G}_y| \quad (1)$$

where $G_{xt\_GVC}$ is a longitudinal-acceleration command (longitudinal acceleration target value), $C_{xy}$ is a gain factor, and $G_Y$ is the lateral acceleration of the controlled vehicle and $\dot{G}_y$ is the lateral jerk of the controlled vehicle derived as a time derivative of the lateral acceleration of the controlled vehicle. Equation (1) is a basic equation for controlling longitudinal-acceleration in coordination with lateral motion; in other words, it is a very simple control rule: $G_{xt\_GVC}$ is basically determined by the product of $C_{xy}$ and $G_Y$ with a time lag of the first order (Ts). According to the results of vehicle tests, it was confirmed that Equation (1) can imitate part of the coordinate-control strategy of an expert driver.

Specifically, based on sensor input by a sensor A or sensor system, which is configured to directly input a regularly or periodically determined or even continuously monitored lateral acceleration $G_Y$ in the pitch axis direction of a vehicle to a control unit (controller) or indirectly provide sensor information on the basis of which the lateral acceleration $G_Y$ can be estimated, a longitudinal acceleration control target value $G_{xt\_GVC}$ is determined, and output to one or more actuators B for vehicle acceleration/deceleration according to the longitudinal acceleration control target value $G_{xt\_GVC}$ output from the control unit.

The sensor A or sensor system may comprise acceleration sensitive sensors such as e.g. motion sensors, accelerometers and/or yaw-rate, pitch-rate and/or roll-rate sensitive gyrosensors. In addition, or alternative, the sensor A may comprise a steering wheel (or driving wheel) angular sensor sensitive to a steering wheel angle (or driving wheel angle) and a lateral acceleration may be calculated on the basis of vehicle speed and the determined steering wheel angle (or driving wheel angle), and/or it may be estimated on the basis of pitch, roll and/or yaw rates determined by a gyro-sensor.

Based on the input lateral acceleration $G_Y$, a derivative of the lateral acceleration $G_Y$ with respect to time is derived or calculated, referred to as lateral jerk $\dot{G}_Y$, and based on the lateral acceleration $G_Y$ and the lateral jerk $\dot{G}_Y$, the longitudinal acceleration target control value $G_{xt\_GVC}$ is calculated according to the equation (1) above.

Here, $C_{xy}$ and T are auxiliary control parameters that can be pre-defined and stored in a memory unit of the control unit 1. $C_{xy}$ is referred to as a "gain factor" (a dimensionless parameter), and the longitudinal acceleration target control value $G_{xt\_GVC}$ is directly proportional to the gain factor $C_{xy}$ and the absolute value of the lateral jerk $\dot{G}_Y$. The longitudinal acceleration target control value $G_{xt\_GVC}$ increases with increased gain factor $C_{xy}$ and decreases with decreased gain factor $C_{xy}$. Another control parameter may be included such as T which is referred to as a "time constant" or "time factor" (a dimensionless parameter). Here, the longitudinal acceleration target control value $G_{xt\_GVC}$ increases with decreased time factor T and decreases with increased time factor T.

According to equation (1) above, the sign of the longitudinal acceleration target control value $G_{xt\_GVC}$ is opposite to the sign of the product of the lateral acceleration $G_Y$ and the lateral jerk $\dot{G}_Y$.

Here, the lateral acceleration $G_Y$ may discriminate between left and right lateral direction by being negative for left (or right) sided lateral acceleration and correspondingly being positive for right (or left) sided lateral acceleration. On the other hand, lateral acceleration $G_Y$ may also only refer to an absolute value of lateral acceleration, however, then the lateral jerk $\dot{G}_Y$ needs to refer to the derivative of the absolute value of lateral acceleration with respect to time.

Figure 2:
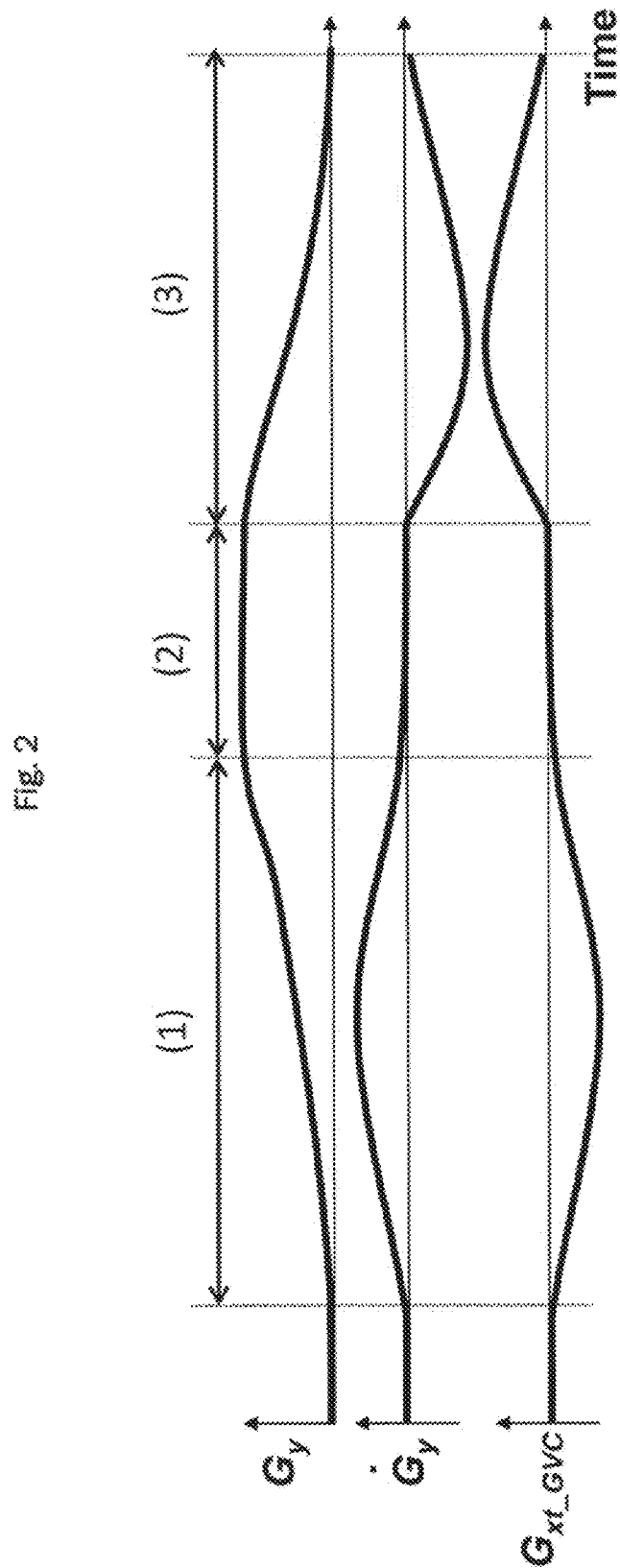
FIG. 2 exemplarily shows a relation between lateral acceleration $G_y$, lateral jerk $\dot{G}_Y$ and a longitudinal acceleration target value $G_{xt\_GVC}$ determined according to GVC.

FIG. 2 exemplarily illustrates a relation between lateral acceleration $G_Y$, lateral jerk $\dot{G}_Y$ and longitudinal acceleration $G_x$ controlled based on lateral acceleration $G_Y$ and jerk $\dot{G}_Y$ as a function of time, when the longitudinal acceleration $G_x$ is controlled according to the longitudinal acceleration target control value $G_{xt\_GVC}$ as described above. FIG. 2 exemplarily shows the relation between lateral acceleration ($G_y$), lateral jerk ($\dot{G}_Y$) and longitudinal acceleration command of G-Vectoring Control (GVC) ($G_{xt\_GVC}$). When the vehicle starts turning a corner, it starts braking simultaneously as the lateral jerk increases (FIG. 2 (1)). After that, the braking stops during steady-state cornering (FIG. 2 (2)), because the lateral jerk becomes zero. The vehicle begins to accelerate when it begins to return to straight-ahead driving (FIG. 2 (3)).

Specifically, when a vehicle is entering a curve for cornering and the driver moves the steering wheel so that the vehicle turns about the yaw axis, lateral acceleration $G_Y$ (which is zero on a straight road independent of whether the vehicle is accelerating, decelerating or moving at a constant speed) will start to increase from zero, see period between times $t_1$ and $t_2$ in FIG. 2.

In an intermediate period between times $t_2$ and $t_3$ in FIG. 2, lateral acceleration will $G_Y$ reach a maximum value and may stay approximately constant until it decreases again down to zero in a last cornering period between times $t_3$ and $t_4$ in FIG. 2 when leaving the curve at the curve exit.

Here, depending on the topology of the curve, the time period between times $t_2$ and $t_3$ may be very short or not even exist. In the later case, the lateral acceleration $G_Y$ may increase from zero to a maximum value and thereafter directly decrease again down to zero when leaving the curve.

As shown in FIG. 2, the lateral jerk $\dot{G}_Y$ will increase to a maximum value during this cornering scenario and decrease again down to zero between times $t_1$ and $t_2$. In the intermediate time period between times $t_2$ and $t_3$, where the lateral acceleration $G_Y$ does not vary significantly, the lateral jerk $\dot{G}_Y$ remains zero, and in the last time period between times $t_3$ and $t_4$, lateral jerk $\dot{G}_Y$ will decrease from zero to a minimum during this cornering scenario value and increase again up to zero.

The longitudinal acceleration target control value $G_{xt\_GVC}$ as described above will behave similarly to the absolute value of the lateral jerk $\dot{G}_Y$ because being directly proportional to the absolute value of the lateral jerk $\dot{G}_Y$ but the sign is the opposite sign of the product of lateral acceleration and jerk.

Consequently, directly after entering the curve and beginning the cornering in the first period between times $t_1$ and $t_2$, the longitudinal acceleration target control value $G_{xt\_GVC}$ will decrease down from zero to a minimum value during this cornering scenario and increase again to zero. In this period, the longitudinal acceleration target control value $G_{xt\_GVC}$ is negative and thus corresponds to a negative acceleration or deceleration (braking) of the vehicle in the first phase of cornering. Accordingly, during the whole period between times $t_1$ and $t_2$, vehicle speed will be decreased (deceleration or braking control).

In the intermediate period between times $t_2$ and $t_3$, the longitudinal acceleration target control value $G_{xt\_GVC}$ will remain approximately zero as long as the lateral jerk $\dot{G}_Y$ remains approximately zero, i.e. the vehicle will move by an approximately constant speed through the curve during the cornering during the period between times $t_2$ and $t_3$.

Finally, in the last stage of cornering before leaving the curve, during the period between times $t_3$ and $t_4$, the longitudinal acceleration target control value $G_{xt\_GVC}$ will increase up from zero to a maximum value during this cornering scenario and decrease again to zero. In this period, the longitudinal acceleration target control value $G_{xt\_GVC}$ is positive and thus corresponds to a positive acceleration of the vehicle in the final phase of cornering. Accordingly, during the whole period between times $t_3$ and $t_4$, vehicle speed will be increased (acceleration control).

Figure 3:
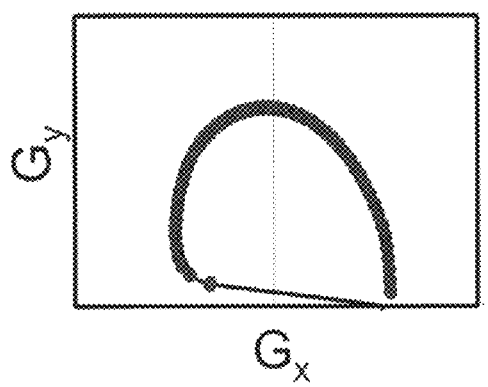
FIG. 3 exemplarily shows a g-g-diagram.

FIG. 3 exemplarily shows a g-g-diagram for the lateral and longitudinal accelerations $G_Y$ and $G_x$ during cornering of the vehicle under control of longitudinal acceleration $G_x$ based on lateral acceleration $G_Y$ and jerk $\dot{G}_Y$ according to the longitudinal acceleration target control value $G_{xt\_GVC}$. Here, the horizontal axis denotes the longitudinal acceleration $G_x$ (negative values on the left and positive values on the right), and the vertical axis denotes positive values of the lateral acceleration $G_Y$.

According to the relations as explained with reference to FIG. 2, the g-g-diagram of FIG. 3 will be run through in a clockwise direction starting at the origin where $G_x=G_Y=0$ before entering the curve prior to cornering. As soon as the vehicle starts cornering, the lateral acceleration $G_Y$ will increase, resulting in a negative longitudinal acceleration $G_x$ until the lateral acceleration $G_Y$ reaches a maximum value, resulting in the longitudinal acceleration $G_x$ being zero, whereafter the lateral acceleration $G_Y$ will decrease again down to zero in the final stage of cornering, resulting in a positive longitudinal acceleration $G_x$ until the lateral acceleration $G_Y$ reaches zero again at the exit of the curve.

Summarizing the above, in the control of the longitudinal acceleration $G_x$ of the vehicle according to the longitudinal acceleration target control value $G_{xt\_GVC}$, when the vehicle starts entering a corner, the vehicle will automatically brake (or decelerate) simultaneously as the lateral jerk $\dot{G}Y$ increases (see the period between times $t_1$ and $t_2$ in FIG. 2, left side of FIG. 3), and thereafter the vehicle may remain in a steady-state cornering in which no longitudinal acceleration or deceleration is performed (i.e. the vehicle stops braking without accelerating again) in the period between times $t_2$ and $t_3$ in FIG. 2 because the lateral jerk $\dot{G}_Y$ becomes zero. Finally, the vehicle begins to accelerate again in the final stage of cornering when the vehicle begins to return to straight-ahead driving (see the period between times $t_3$ and $t_4$ in FIG. 2, right side of FIG. 3).

In addition to GVC as discussed above, as another longitudinal-acceleration control based on curvature, longitudinal-acceleration using longitudinal-acceleration model called "Preview G-Vectoring Control" (PGVC) is also available.

Figure 4:
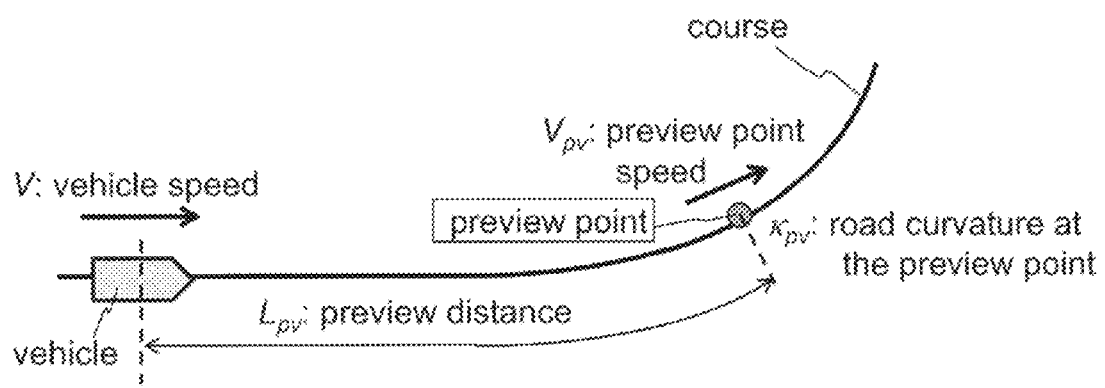
FIG. 4 exemplarily illustrates a longitudinal-acceleration model based on a general look-ahead concept for Preview G-Vectoring Control (PGVC).

FIG. 4 shows the longitudinal-acceleration model based on a general look-ahead concept using a preview point (e.g. a point on the course ahead of the controlled vehicle by distance Lpv): the speed of the controlled vehicle at this point (Vpv), vehicle speed (V), and road-curvature at the preview point (κ pv). When the vehicle is traveling at constant speed at the preview point, lateral-acceleration generated on the vehicle (Gy_pv) is given in Equation (2) as follows.

$$G_{y\_pv} = \kappa_{pv} \cdot V^2 \quad (2)$$

By assuming that acceleration/deceleration is executed with an equivalent algorithm to longitudinal-acceleration control in response to lateral motion of the vehicle (i.e., GVC), it is possible to control longitudinal-acceleration before lateral motion of the vehicle actually occurs. With GVC, on the basis of the above-mentioned assumption, longitudinal-accelerations corresponding to Gy_pv are calculated by using Gy_pv in place of the lateral jerk ($\dot{G}_Y$) given by Equation (1). In this manner, a longitudinal-acceleration command value (Gxt_pv) related to the lateral motion of the vehicle that will be generated (rather than lateral motion of the vehicle that was generated) is given. Under the some assumptions (κ pv is positive, V is constant), Gxt_pv is given by Equation (3) from Equations (1), (2) using gain (Cxy_pv) and time constant (Tpv).

$$G_{xt\_pv} = -\frac{C_{xy\_pv}}{1 + T_{pv}s} \cdot k_{pv} \cdot V^2 \quad (3)$$

Figure 5:
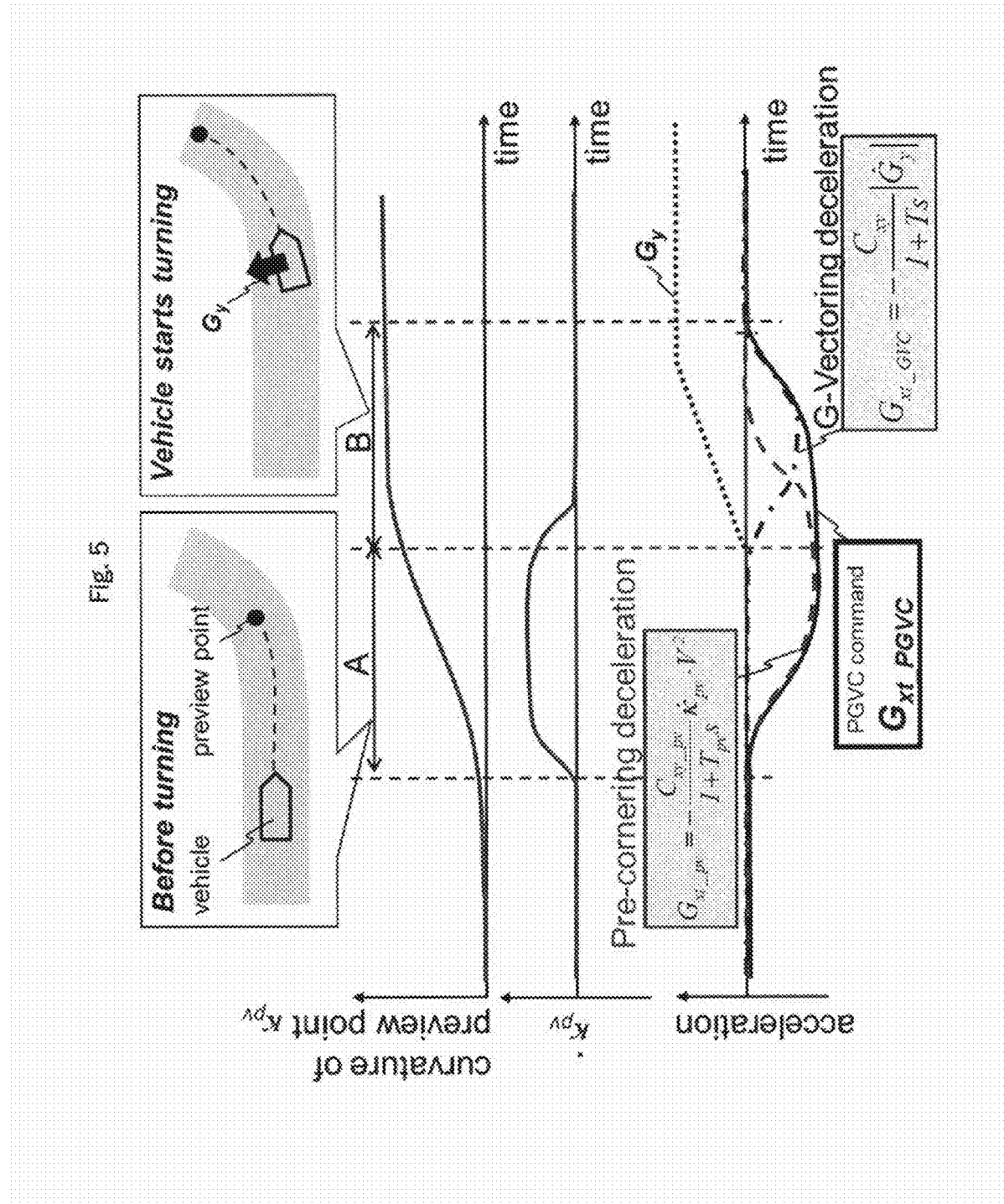
FIG. 5 exemplarily shows an illustration of the deceleration control by Preview G-Vectoring Control (PGVC).
Figure 6:
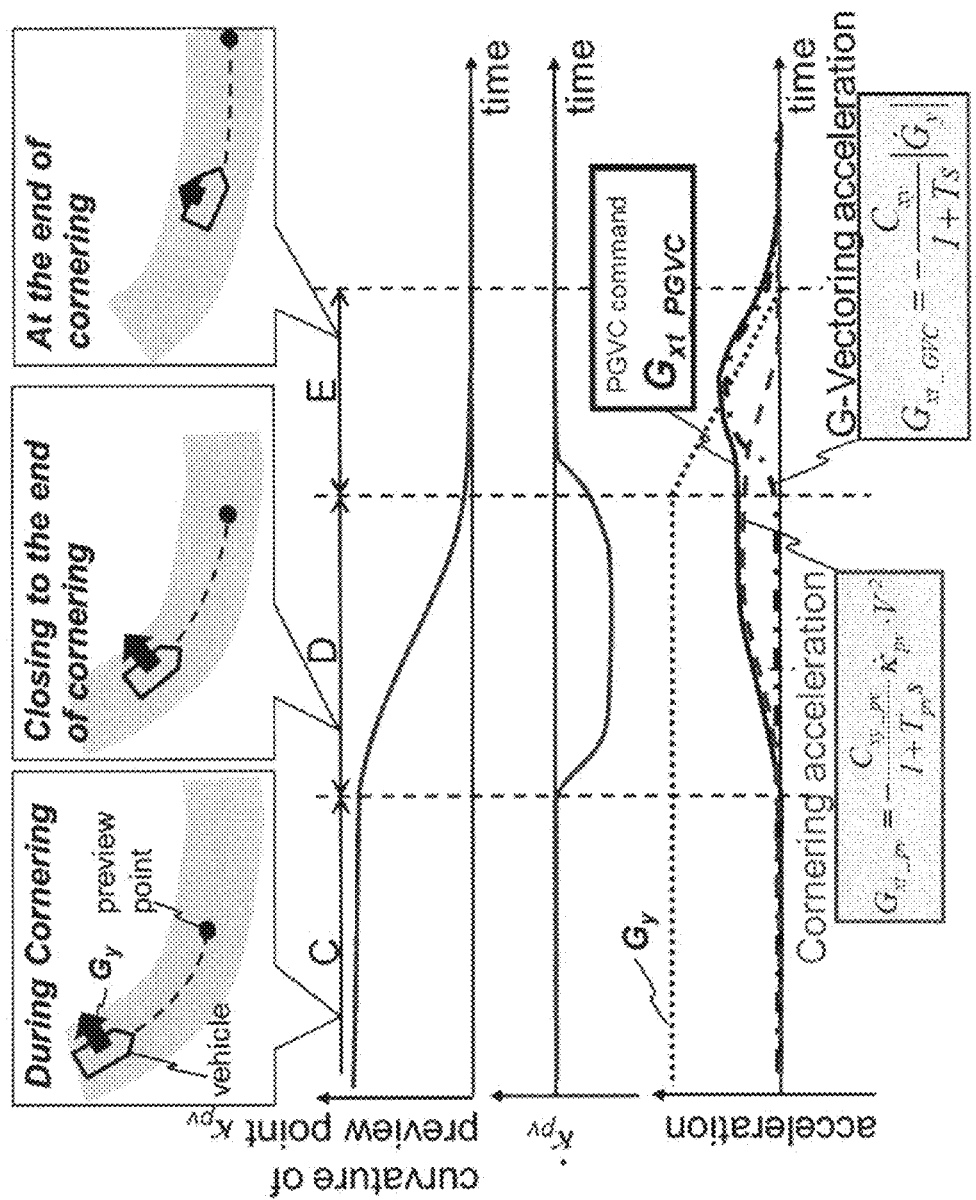
FIG. 6 exemplarily shows exemplarily shows an illustration of the acceleration control by Preview G-Vectoring Control (PGVC).

The longitudinal control of PGVC (Gxt_PGVC) is calculated based on the G-Vectoring Control command (Gxt_GVC) described by Equation (1) and longitudinal-acceleration for cornering (Gxt_pv) described by Equation (3). FIG. 5 and FIG. 6 show the typical cornering scenario with deceleration/acceleration control by PGVC.

FIG. 5 exemplarily shows the first stage of cornering from closing to the curve to the steady state of cornering. When the vehicle closes to the curve, the curvature of preview point (κ pv) increases before the vehicle starts turning (FIG. 5, section A). In this phase, κ pv increases and Pre-cornering deceleration command (Gxt_pv) is calculated based on K p (dash line). After the vehicle starts turning (FIG. 5, section B), lateral-acceleration (Gy) starts increasing. In this phase, G-Vectoring deceleration command (Gxt_GVC) is calculated based on lateral jerk information (dash-dot line). The deceleration command by PGVC is calculated by combining Gxt_pv and Gxt_GVC as shown in FIG. 5 (solid line). As the results. PGVC can decelerate the vehicle during the first stage of cornering.

FIG. 6 exemplarily shows the last stage of cornering: from the steady state to the end of the curve. While the curvature of preview point (κ pv) is constant. PGVC gives no acceleration/deceleration (keep the constant speed) (FIG. 6C). When κ pv starts decreasing and κ pv becomes minus, cornering acceleration command (Gxt_pv) is calculated based on κ p (dash line) (FIG. 6, section D). At the end of cornering, lateral-acceleration (Gy) starts decreasing, and G-Vectoring acceleration command (Gxt_GVC) is calculated based on lateral jerk information (dash-dot line) (FIG. 6, section E). The acceleration command by PGVC can be calculated by combining Gxt_pv and Gxt_GVC as shown in FIG. 6 (solid line). As the result, PGVC can accelerate the vehicle with the decreasing distance from the end of the curve.

Figure 7:
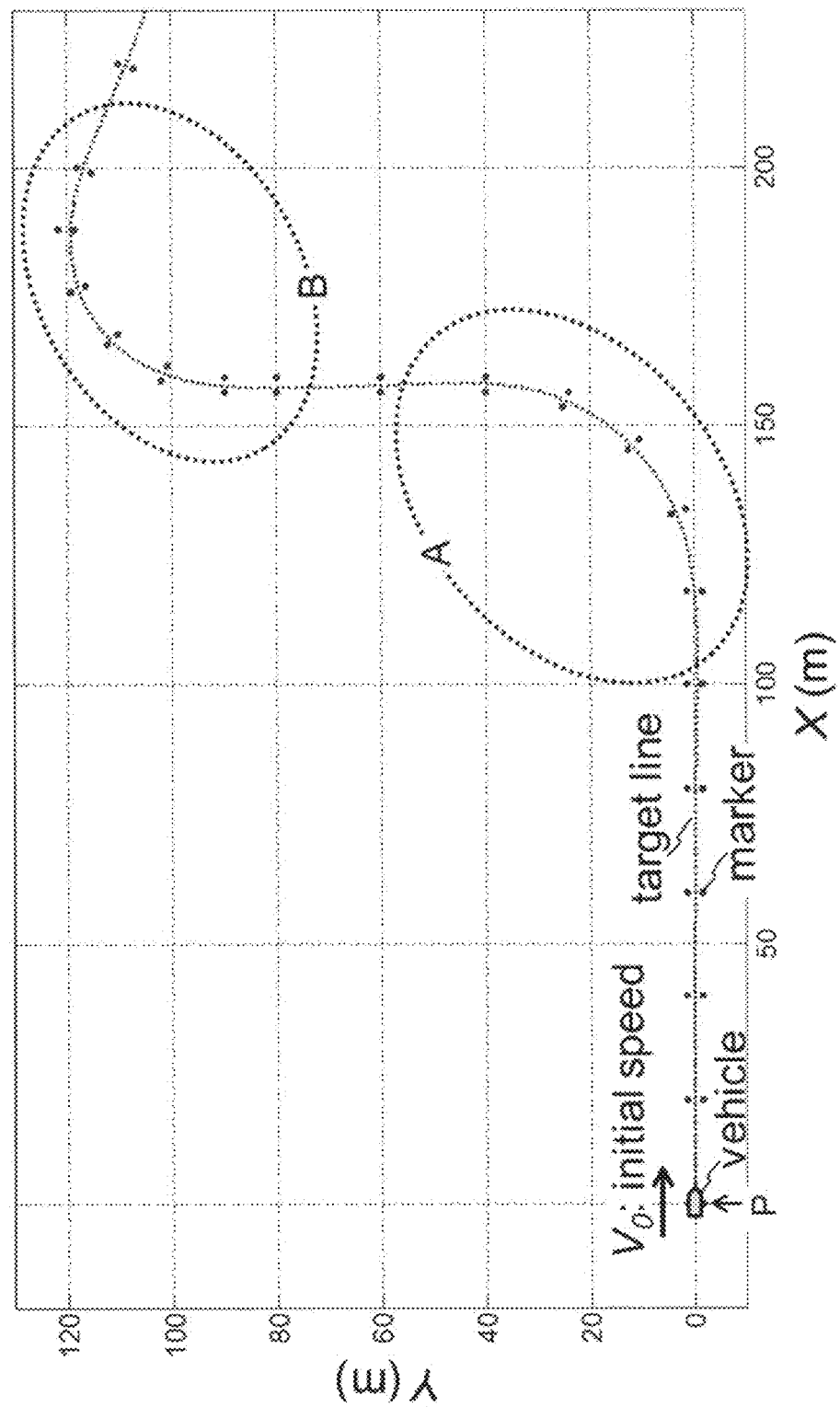
FIG. 7 exemplarily shows an illustration of a two-cornering course layout.

FIG. 7 exemplarily shows the two-cornering course to compare Gxt_PGVC with the driver's acceleration/deceleration behavior.

Figure 8:
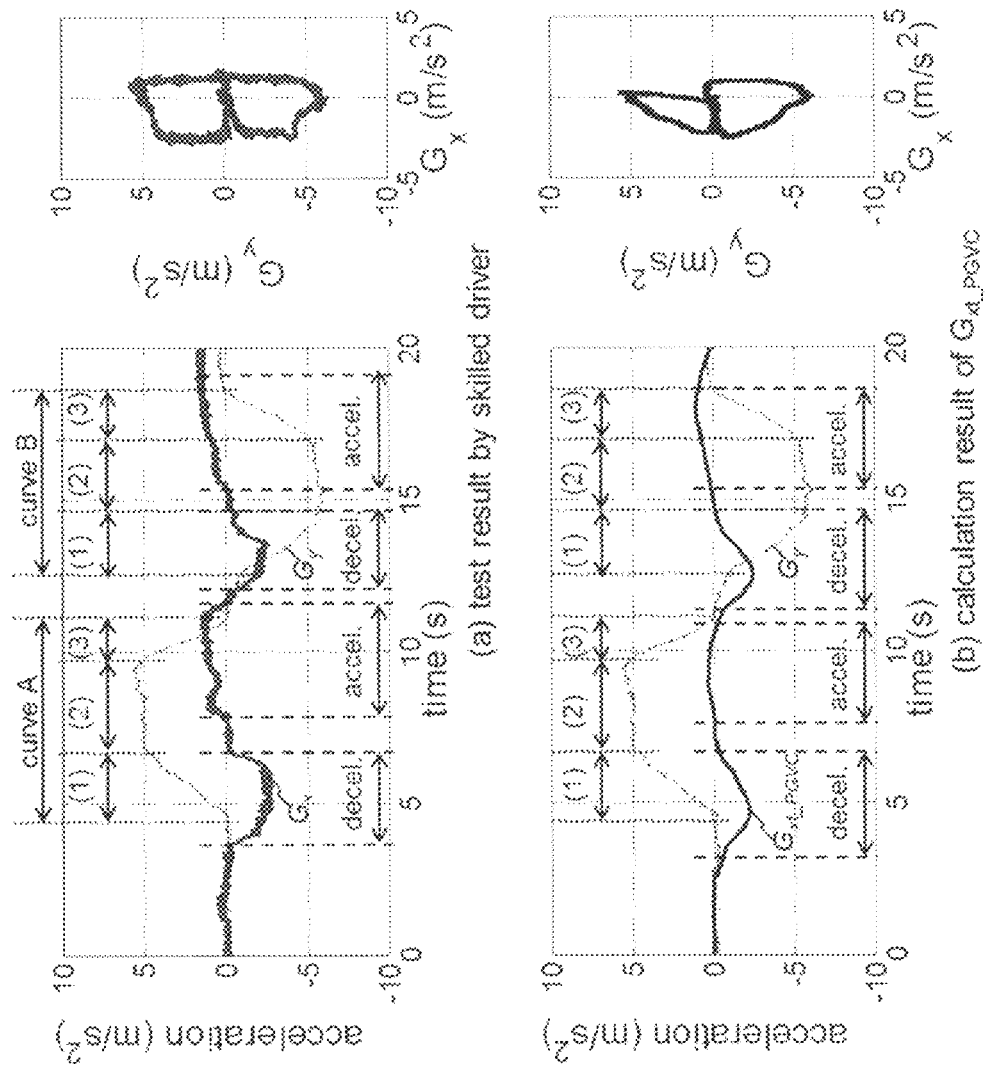
FIG. 8 exemplarily shows a comparison of longitudinal-acceleration caused by skilled driver and calculation result of PGVC command ($G_{xt\_PGVC}$).

FIG. 8 shows the comparison of longitudinal-acceleration caused by skilled driver (FIG. 8 (a)) and calculation result of PGVC command (Gxt_PGVC) (FIG. 8 (b)) at 80 km/h as initial speed (VO): left side shows the change of longitudinal- and lateral-acceleration (Gx, Gy), and right side shows "g-g" diagram.

In FIG. 8 (b), PGVC command (Gxt_PGVC) is calculated based on Equations (1) and (3) above using the curvature data calculated from target line shown in FIG. 7, measured data of vehicle speed and lateral-acceleration by driving tests. As shown in FIG. 8, lateral-acceleration (Gy), changes to plus for curve A and minus for curve B, and each lateral-acceleration change has three phases: increasing phase (phase (1)), steady state phase (phase (2)) and decreasing phase (phase (3)). The driver controls acceleration/deceleration depends on the lateral-acceleration changes; starts decelerating the vehicle (FIG. 8 "decel.") before the phase (1) starts and finishes it when the phase (1) finishes. After that, the driver starts accelerating (FIG. 8 "accel.") in phase (2), that is, before the phase (3) starts. As shown in FIG. 8 (b), the calculated PGVC command (Gxt_PGVC) has same feature with this driver's acceleration/deceleration. Also "g-g" diagram by Gxt_PGVC (FIG. 8 (b)) shows the same shape with driver's one (FIG. 8 (a)).

Figure 9:
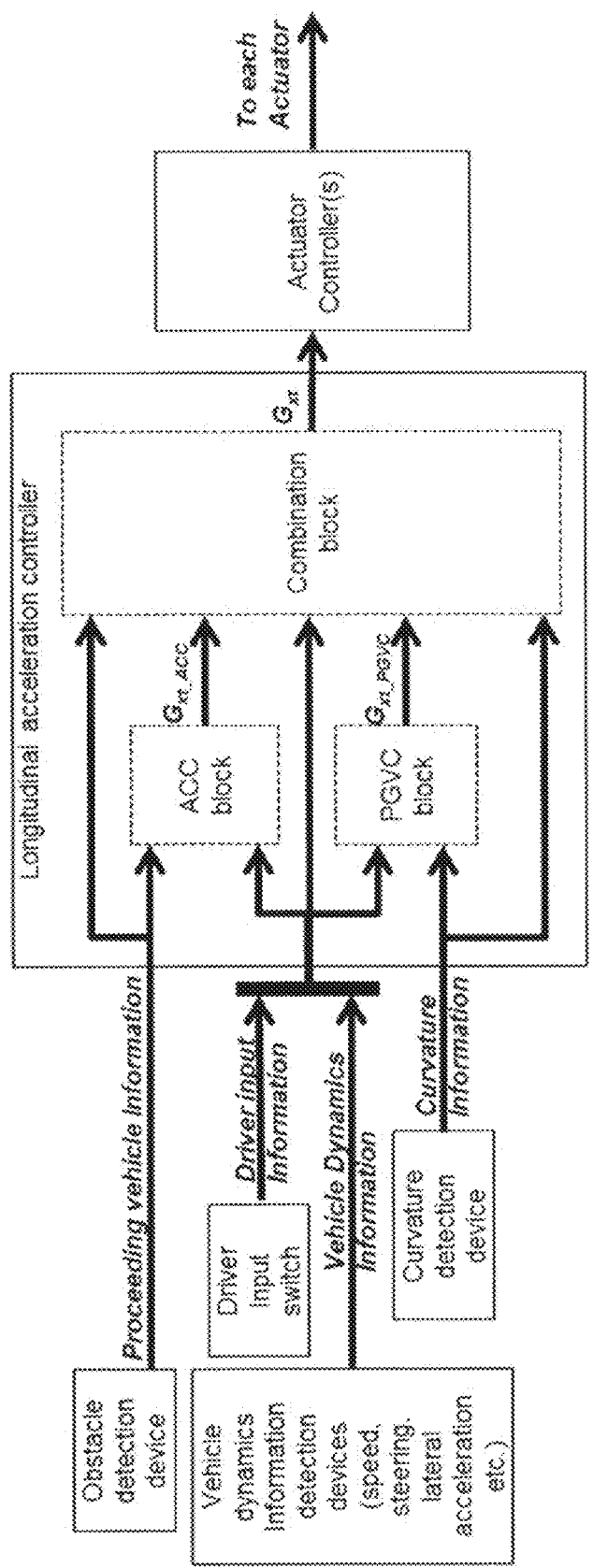
FIG. 9 exemplarily shows a schematic block diagram of a controller system according to an embodiment of the present invention.

FIG. 9 exemplarily shows the block diagram of longitudinal-acceleration control system. In this system, ACC and PGVC are dealt as an independent function to replace/add/remove the functions easily. Under these two functions, the combination block 130 is set combine the longitudinal-acceleration command of ACC (Gxt_ACC) and PGVC (Gxt_PGVC). The combination block 130 calculates the longitudinal-acceleration command (Gxt) and send it to the controller(s) 200 which controls the actuators for acceleration/deceleration of the vehicle (or it may send the longitudinal-acceleration command (Gxt) directly to actuators in other embodiments).

The control system according to FIG. 9 comprises a longitudinal acceleration controller 100 (embodying a longitudinal acceleration control means) comprising an ACC block 110 (embodying a second longitudinal acceleration target value determining means), a PGVC block 120 (embodying a first longitudinal acceleration target value determining means), and a combination block 130 (embodying a third longitudinal acceleration target value determining means). The combination block 130 receives the respective control commands (target values) Gxt_ACC and Gxt_PGVC from the ACC block 110 and the PGVC block 120, respectively, and determines based on Gxt_ACC and Gxt_PGVC the final command target value Gxt to be output to the actuator controller(s) 200 (or directly to actuators) for control of the longitudinal acceleration of the controlled vehicle based on the calculated target value Gxt.

The system further comprises vehicle dynamics information detection devices 210, curvature detection devices 220, a driver input switch 230 and an obstacle detection device 240. Specifically, a driver input switch 230 may be adapted to allow a user to select parameter settings of the PGVC parameters which can be input as driver input information to the PGVC block 120. On the other hand, vehicle dynamics information detection devices 210 (such as sensors including speed sensor, accelerometer, gyro-sensor, steering wheel angle sensor etc.) may provide information on the vehicle dynamics (vehicle dynamics information) such as vehicle speed, steering wheel angle, lateral and/or longitudinal acceleration acting on the controlled vehicle etc. The vehicle dynamics information is provided to the PGVC block 120. In addition curvature information (such as map data and/or a curvature at a preview point determined based on map data) is provided from a curvature detection device 220 to the PGVC block 120 embodying the longitudinal acceleration target value determining means. The obstacle detection device 240 may receive data from the proceeding vehicle indicating a position, speed, lateral acceleration, and/or longitudinal acceleration acting on the proceeding vehicle, e.g. via a communication protocol. Alternatively or in addition, the obstacle detection device 240 may comprise sensors (such as camera, radar, sonar etc.) for determining a relative position and/or speed of the proceeding vehicle.

In addition to the above, information from the vehicle dynamics information detection devices 210, the curvature detection devices 220, the driver input switch 230 and/or the obstacle detection device 240 may also be provided to the combination block 130 for calculation weighting factors as described below.

In order to combine the target values Gxt_ACC and Gxt_PGVC as a finally output target value Gxt, it would be possible to make Gxt by switching Gxt_ACC and Gxt_PGVC depending on the driving scene (following the proceeding vehicle, driving on the straight road, cornering etc.). However, all driving pattern and scene should be considered including complex scene and it would make the combination block complicated. Furthermore. Gxt may change discontinuously from one to the other by switching which would provide discomfort to the driver and may reduce safety.

According to an embodiment of the invention, it is proposed to combine these target value signals based on a select-minimum method. With this method, the smaller value of Gxt_ACC and Gxt_PGVC is selected as Gxt; deceleration command of Gxt_ACC or Gxt_PGVC, which is important value to keep the safe driving condition, has a priority to be a Gxt. Therefore, select-minimum method is highly useful from the aspects of safety.

However, in some scenarios this method may not always work optimally, because the acceleration command of Gxt_ACC/Gxt_PGVC is not activated in some scenarios. This limited acceleration control might give the discomfort to the driver. For example, Gxt_ACC can be set to a small value to avoid the unexpected acceleration during cornering until lateral-acceleration or steering angle becomes enough small. This function of ACC is necessary to keep safety when no curvature information is available. However, this deceleration control of ACC will be always selected during cornering and the acceleration command of Gxt_PGVC will not be activated, even though it is expected acceleration by drivers.

To make the combination block as simple as possible with the continuity of Gxt and adaptability for each scene (including the avoidance of such too much deceleration control), select-minimum method with weighting function based on $\Delta V_{tgt}$, $\Delta D$, $\Delta V_{pv}$ and estimated lateral-acceleration (Gy_est) can be adopted in other embodiments; wherein $\Delta V_{tgt}$ is the difference between actual speed V of the controlled vehicle and a target speed Vtgt ($\Delta V_{tgt}$=Vtgt−V), $\Delta D$ is the difference between actual distance from the proceeding vehicle and a target distance, $\Delta V_{pv}$ is the difference between the actual speed of the controlled vehicle and the speed $V_{pv}$ of the proceeding vehicle ($\Delta V_{pv}$=Vpv−V), and Gy_est is the estimated lateral-acceleration based on the lateral-acceleration of preview point and the vehicle.

Figure 10:
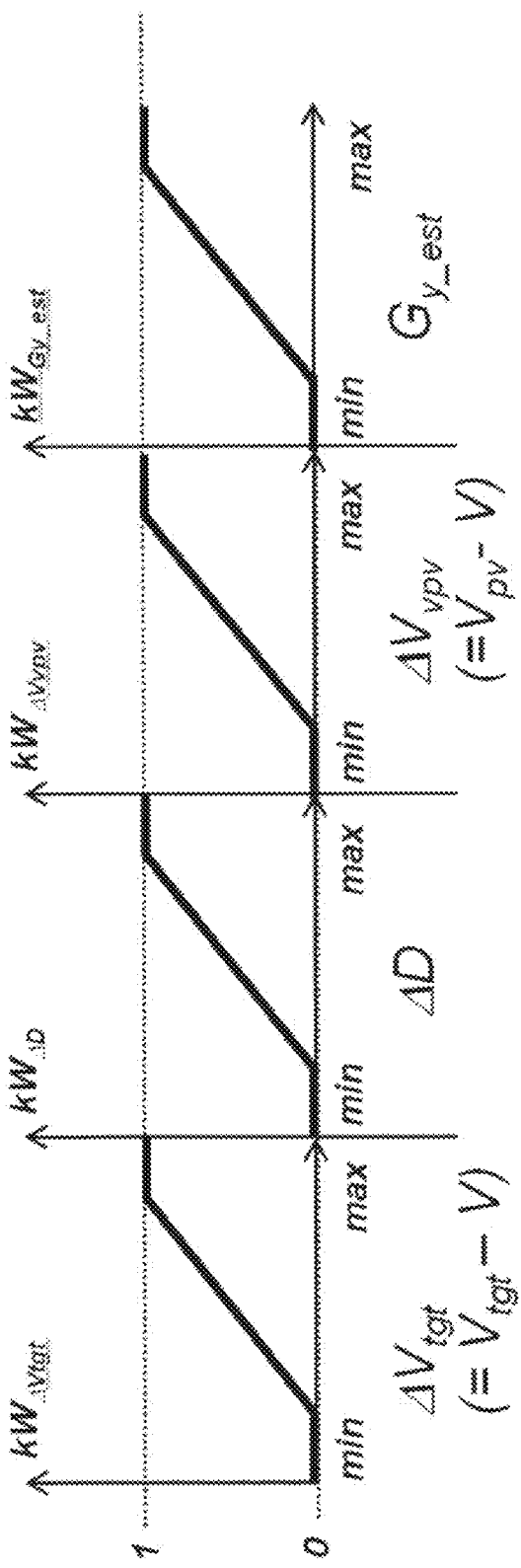
FIG. 10 exemplarily shows a schematic illustration of weighting functions according to an embodiment of the present invention.

FIG. 10 shows exemplary weighting functions based on $\Delta V_{tgt}$, $\Delta D$, $\Delta V_{pv}$ and Gy_est. The weighting functions are set to increase the priority of Gxt_PGVC with increasing each values ($\Delta V_{tgt}$, $\Delta D$, $\Delta V_{pv}$ and Gy_est): Gxt_ACC is activated on a priority basis in the case vehicle speed close to/bigger than target speed, or the distance from the proceeding vehicle becomes smaller; Gxt_PGVC is activated on a priority basis in the case the estimated lateral-acceleration becomes bigger.

Specifically, there may be provided four weighting functions kW($\Delta V_{tgt}$), kW($\Delta D$), kW($\Delta V_{pv}$), and kW(Gy_est), which respectively increase from 0 to 1 within intervals from minimum values to maximum values of $\Delta V_{tgt}$, $\Delta D$, $AV_{pv}$, and Gy_est, respectively. Depending on the determined values of $\Delta V_{tgt}$, $\Delta D$, $\Delta V_{pv}$, and Gy_est (based on sensor input), the values of weighting factors can be determined as kW($\Delta V_{tgt}$), kW($\Delta D$), kW($\Delta V_{pv}$), and kW(Gy_est) based on the weighting functions.

Then, a weighting factor kW can be determined based on e.g. the minimum of the individual is weighting factors kW($\Delta V_{tgt}$), kW($\Delta D$), kW($\Delta V_{pv}$), and kW(Gy_est) or based on a product of the individual weighting factors $kW(\Delta Vt_{tgt})$, $kW(\Delta D)$, $kW(\Delta V_{vpv})$, and $kW(Gy\_est)$:

$$kW = \min(kW_{\Delta Vtgt}, kW_{\Delta D}, kW_{\Delta Vvpv}, kW_{Gy\_est})$$

or $$kW = kW_{\Delta Vtgt} kW_{\Delta D} kW_{\Delta Vvpv} kW_{Gy\_est}$$

The determined weighting factor kW will then be a factor from the interval between 0 and 1. Then, a longitudinal acceleration control target value $G_{xt\_GVC}$ determined from the PGVC algorithm discussed above (or only GVC) can be adjusted and a longitudinal acceleration control target value $G_{xt\_ACC}$ determined from the ACC algorithm (or only CC) can be adjusted by use of the weighting factor kW as follows:

$$G_{xt\_ACC\_adjusted} = G_{xt\_ACC} + kW \cdot \max[0, (G_{xt\_ACC})]$$

$$G_{xt\_PGVC\_adjusted} = G_{xt\_PGVC} - (1-kW) \cdot (G_{xt\_PGVC} - G_{xt\_ACC})(G_{xt\_PGVC} \geq 0)$$

$$G_{xt\_PGVC\_adjusted} = G_{xt\_PCVC}(G_{xt\_PGVC} < 0)$$

Finally, according to an embodiment of the present invention, a final combined longitudinal acceleration control target value $G_{xt}$ can be determined based on the two adjusted longitudinal acceleration control target values $G_{xt\_ACC\_adjusted}$ and $G_{xt\_PGVC\_adjusted}$ based on a select-minimum method as $$G_{xt} = \min(G_{xt\_ACC\_adjusted}, G_{xt\_PGVC\_adjusted}).$$

The final combined longitudinal acceleration control target value $G_{xt}$ can be output to actuators as a command value for the actual longitudinal acceleration control of the controlled vehicle.

Figure 11:
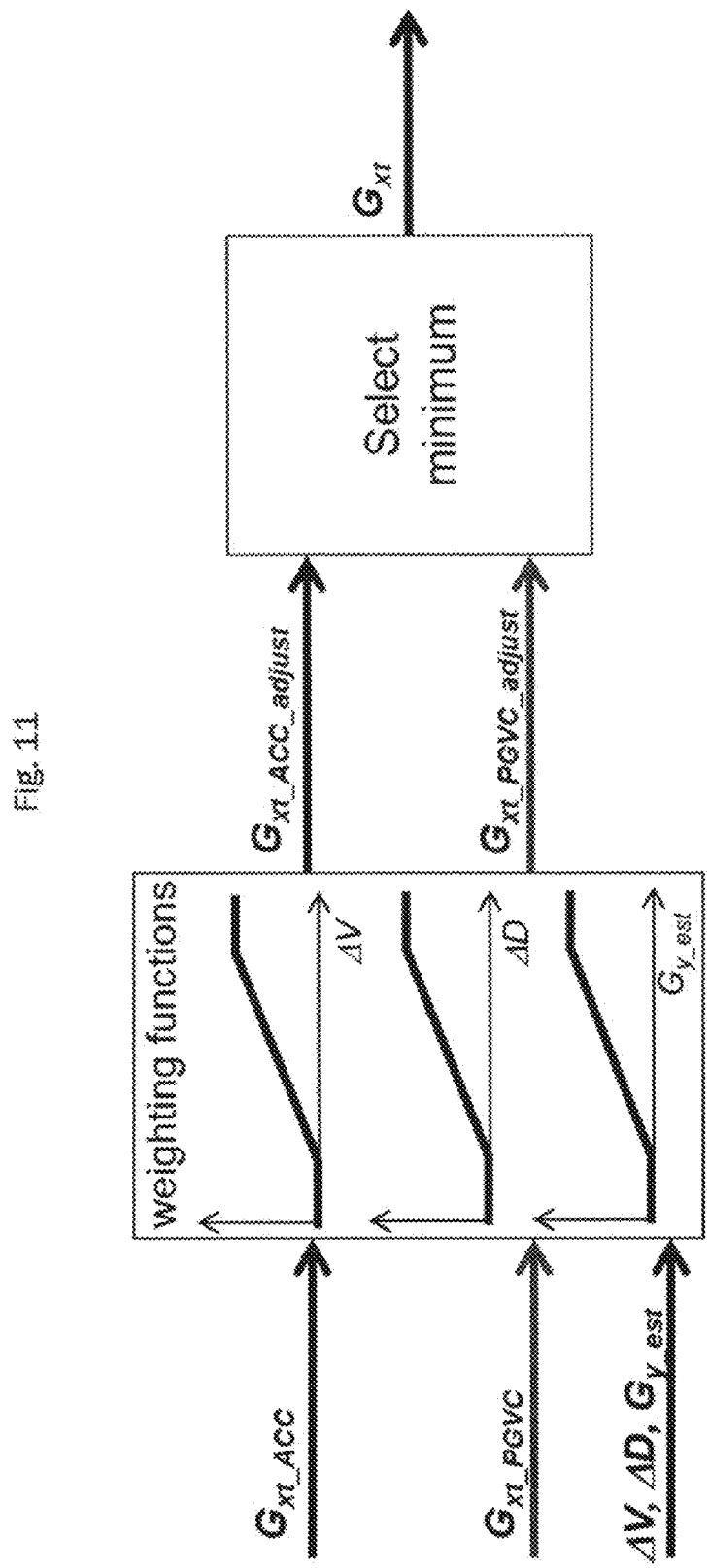
FIG. 11 exemplarily shows a schematic block diagram of a combination block of a controller system according to an embodiment of the present invention.

FIG. 11 exemplarily shows the combination block with select-minimum method and weighting functions. Of course, while four weighting functions have been used in the above embodiment, the present invention is not limited to the use of all four weighting functions, and only one or more of the weighting functions $kW(\Delta V_{tgt})$, $kW(\Delta D)$, $kW(\Delta V_{vpv})$, and $kW(Gy\_est)$ can be used.

Figure 12:
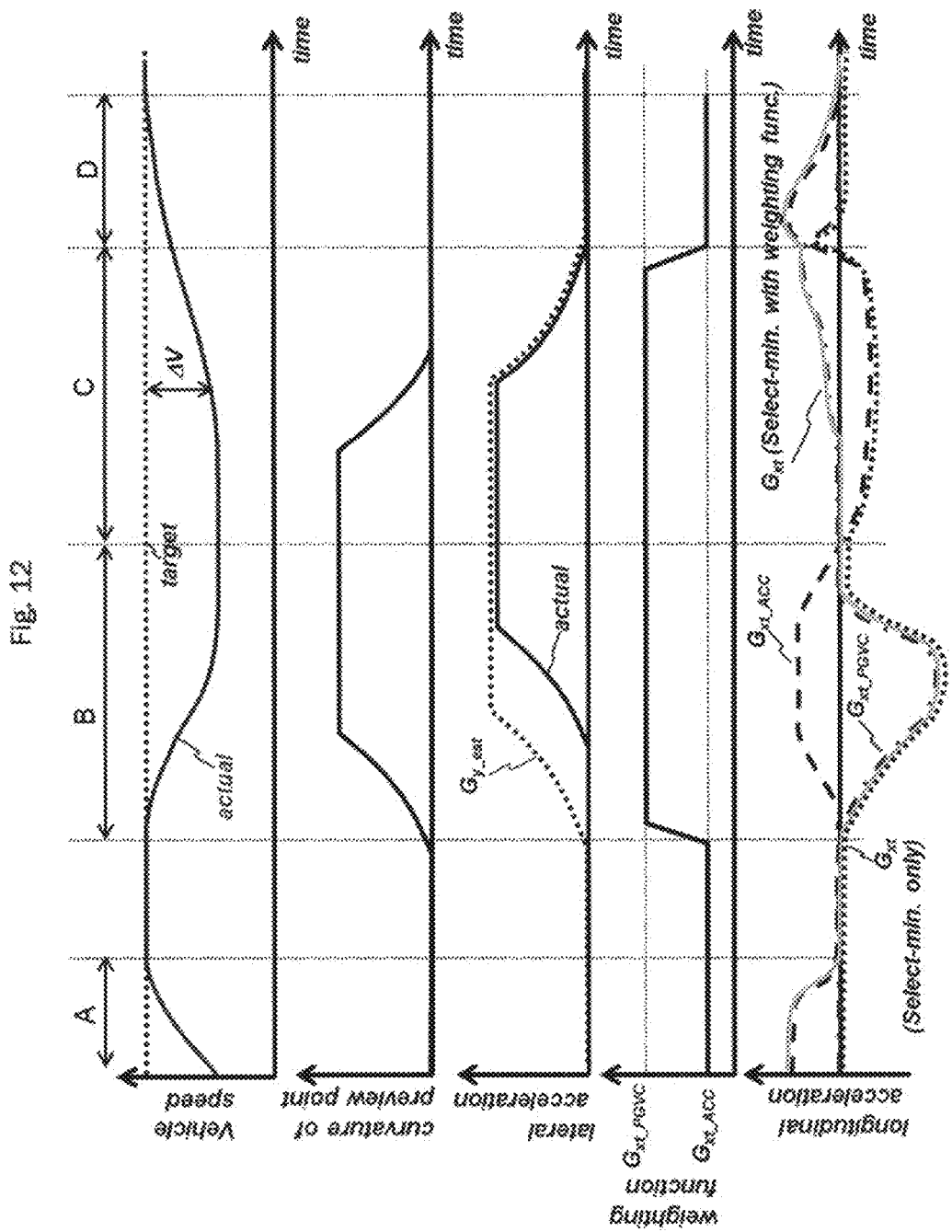
FIG. 12 exemplarily shows an illustration of the longitudinal-acceleration control without a proceeding vehicle.

FIG. 12 exemplarily shows the typical cornering scenario without any proceeding vehicle. When the target speed (dot line in vehicle speed graph) is bigger than actual vehicle speed (solid line in vehicle speed graph), ACC calculates the acceleration command (Gxt_ACC) to achieve the target speed (See FIG. 12, sections A, B, D). If the estimated lateral-acceleration Gy_est (dot line in lateral-acceleration graph) is quite small (almost zero), Gxt_ACC (dash line in longitudinal-acceleration graph) is given high priority and selected as Gxt (solid line in longitudinal-acceleration graph), even though Gxt_PGVC (dot line in longitudinal-acceleration graph) is smaller than Gxt_ACC (See FIG. 12, sections A, D). With increasing of Gy_est, the priority of Gxt_PGVC increases and deceleration control of PGVC is selected by select-minimum method (See FIG. 12, section B). After that, acceleration command Gxt_PGVC is selected as Gxt during cornering, because the increase of ΔVtgt and Gy_est gives higher priority to Gxt_PGVC than Gxt_ACC (even though Gxt_ACC is smaller than Gxt_PGVC) (See FIG. 12, section C). If only select-minimum method is used to make Gxt (dot line in longitudinal-acceleration graph), acceleration command of Gxt_ACC in FIG. 12, section A, D and Gxt_PGVC in FIG. 12, section C would not be selected as Gxt and the vehicle would not be accelerated. In the case with the proceeding vehicle, ΔD is used to change the priority of Gxt_ACC in addition to ΔV and Gy_est shown in FIG. 12; the decrease of AD increases the priority of Gxt_ACC.

FIG. 13 exemplarily shows the cornering scenario with a proceeding vehicle. When AD decreases, it increases the priority of Gxt_ACC and deceleration control of ACC to control the distance from the proceeding vehicle is selected (See FIG. 13, section E).

FIG. 14 exemplarily shows the system outline to control the longitudinal acceleration by ACC combined with PGVC. The control system comprises a longitudinal acceleration control unit 1 (e.g. realized as shown in FIG. 9 or FIG. 15 below), an accelerometer 2, a gyro-sensor 3, a steering wheel 4, a steering wheel angle sensor 5, an obstacle detect device 6, a tire 7, a vehicle 8, a curve-detect device 9, a brake control unit 10, a brake actuator 11, a drive-torque control unit 12, a drive-torque actuator 13 and a communication bus line 14.

FIG. 15 exemplarily shows another structure of longitudinal acceleration control system according to another embodiment of the present invention. In this structure, as the only difference to the system of FIG. 9, an ACC control unit/block 300, a PGVC control unit/block 400 and the combination block 130 (which may perform the weighting function application and the select-minimum method as described above) are implemented in different controllers 300, 400 and 100. It is to be noted that other combination patterns are also available (e.g. distance sensor and ACC are implemented in the same controller, PGVC and combination block are implemented in the same controller, etc.).

The control system according to FIG. 15 comprises a longitudinal acceleration controller 100 (embodying a longitudinal acceleration control means) comprising the combination block 130 (embodying a third longitudinal acceleration target value determining means). Separate controllers exemplarily respectively include the PGVC block (PGVC controller 400, e.g. embodying a first longitudinal acceleration target value determining means), and the ACC block (ACC controller 300, e.g. embodying a second longitudinal acceleration target value determining means). The combination block 130 receives the respective control commands (target values) Gxt_ACC and Gxt_PGVC from the ACC controller 300 and the PGVC controller 400, respectively, and determines based on Gxt_ACC and Gxt_PGVC the final command target value Gxt to be output to the actuator controller(s) 200 (or directly to actuators) for control of the longitudinal acceleration of the controlled vehicle based on the calculated target value Gxt.

Here, additionally, one or more or even all of the above-described weighting factors may be considered for adjusting the target values Gxt_ACC and Gxt_PGVC. This adjustment may be performed in the ACC controller 300 and the PGVC controller 400, or, more preferably, in the combination block 130.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. Method for performing driving assistance for a controlled vehicle moving in a longitudinal direction on a road, comprising:
    determining a first longitudinal acceleration target value on the basis of a lateral acceleration of the controlled vehicle,
    determining a second longitudinal acceleration target value on the basis of a target speed of the controlled vehicle, determining a third longitudinal acceleration target value based on a minimum value of the first longitudinal acceleration target value and the second longitudinal acceleration target value, and controlling a longitudinal acceleration of the controlled vehicle on the basis of the determined third longitudinal acceleration target value;

wherein determining the first longitudinal acceleration target value comprises determining a fourth longitudinal acceleration target value on the basis of a lateral acceleration of the controlled vehicle and adjusting the fourth longitudinal acceleration target value on the basis of at least one of:

a difference between an actual speed of the controlled vehicle and the target speed of the controlled vehicle, a difference between an actual distance from the controlled vehicle to a proceeding vehicle and a target distance from the controlled vehicle to the proceeding vehicle, a difference between a speed of the controlled vehicle and a speed of the proceeding vehicle, and an estimated lateral acceleration of the controlled vehicle at a preview point of the road ahead of the controlled vehicle, the estimated lateral acceleration being calculated on the basis of an estimation of curvature of the road at the preview point and the current speed of the controlled vehicle.

2. Method according to claim 1, wherein
the second longitudinal acceleration target value is determined according to cruise control on the basis of the target speed of the controlled vehicle, or the second longitudinal acceleration target value is determined according to adaptive cruise control on the basis of the target speed of the controlled vehicle and on the basis of a target distance from the controlled vehicle to a proceeding vehicle.

3. Method according to claim 1, wherein
adjusting the fourth longitudinal acceleration target value is performed based on a first weighting factor being determined from a weighting function depending on at least one of:

the difference between the actual speed of the controlled vehicle and the target speed of the controlled vehicle, the difference between the actual distance from the controlled vehicle to the proceeding vehicle and the target distance from the controlled vehicle to the proceeding vehicle, the difference between the speed of the controlled vehicle and the speed of the proceeding vehicle, and the estimated lateral acceleration of the controlled vehicle at the preview point of the road ahead of the controlled vehicle.

4. Method according to claim 1, wherein
adjusting the fourth longitudinal acceleration target value is performed based on a first weighting factor being determined from at least one of:

a first weighting function depending on the difference between the actual speed of the controlled vehicle and the target speed of the controlled vehicle, a second weighting function depending on the difference between the actual distance from the controlled vehicle to the proceeding vehicle and the target distance from the controlled vehicle to the proceeding vehicle, a third weighting function depending on the difference between the speed of the controlled vehicle and the speed of the proceeding vehicle, and a fourth weighting function depending on the estimated lateral acceleration of the controlled vehicle at the preview point of the road ahead of the controlled vehicle.

5. Method according to claim 1, wherein determining the second longitudinal acceleration target value comprises determining a fifth longitudinal acceleration target value on the basis of the target speed of the controlled vehicle and adjusting the fifth longitudinal acceleration target value on the basis of at least one of:

a difference between an actual speed of the controlled vehicle and the target speed of the controlled vehicle, a difference between an actual distance from the controlled vehicle to a proceeding vehicle and a target distance from the controlled vehicle to the proceeding vehicle, a difference between a speed of the controlled vehicle and a speed of the proceeding vehicle, and an estimated lateral acceleration of the controlled vehicle at a preview point of the road ahead of the controlled vehicle, the estimated lateral acceleration being calculated on the basis of an estimation of curvature of the road at the preview point and the current speed of the controlled vehicle.

6. Method according to claim 5, wherein
adjusting the fifth longitudinal acceleration target value is performed based on a second weighting factor being determined from a weighting function depending on at least one of:

the difference between the actual speed of the controlled vehicle and the target speed of the controlled vehicle, the difference between the actual distance from the controlled vehicle to the proceeding vehicle and the target distance from the controlled vehicle to the proceeding vehicle, the difference between the speed of the controlled vehicle and the speed of the proceeding vehicle, and the estimated lateral acceleration of the controlled vehicle at the preview point of the road ahead of the controlled vehicle.

7. Method according to claim 5, wherein
adjusting the fifth longitudinal acceleration target value is performed based on a second weighting factor being determined from at least one of:

a first weighting function depending on the difference between the actual speed of the controlled vehicle and the target speed of the controlled vehicle, a second weighting function depending on the difference between the actual distance from the controlled vehicle to the proceeding vehicle and the target distance from the controlled vehicle to the proceeding vehicle, a third weighting function depending on the difference between the speed of the controlled vehicle and the speed of the proceeding vehicle, and a fourth weighting function depending on the estimated lateral acceleration of the controlled vehicle at the preview point of the road ahead of the controlled vehicle.

8. Method according to claim 3, wherein the first and second weighting factors are determined from the same weighting functions such that the sum of the first and second weighting factors amounts to 1.

9. Method according to claim 8, wherein
adjusting the fourth longitudinal acceleration target value f(G is performed such that:
the first longitudinal acceleration target value is determined as the fourth longitudinal acceleration target value, if the fourth longitudinal acceleration target value is smaller than zero, and the first longitudinal acceleration target value is determined by subtracting, from the fourth longitudinal acceleration target value, the product of the first weighting factor and the difference between the fourth longitudinal acceleration target value and the fifth longitudinal acceleration target value, if the fourth longitudinal acceleration target value is equal to or larger than zero.

10. Method according to claim 8, wherein
adjusting the fifth longitudinal acceleration target value is performed such that:
the second longitudinal acceleration target value is determined as the fifth longitudinal acceleration target value, if the fifth longitudinal acceleration target value is larger than the fourth longitudinal acceleration target value, and the second longitudinal acceleration target value is determined by adding, to the fifth longitudinal acceleration target value, the product of the second weighting factor and the difference between the fourth longitudinal acceleration target value and the fifth longitudinal acceleration target value, if the fifth longitudinal acceleration target value is equal to or smaller than the fourth longitudinal acceleration target value.

11. Method according to claim 1, wherein determining the first longitudinal acceleration target value comprises determining a sixth longitudinal acceleration target value being calculated on the basis of a determined lateral acceleration and a corresponding lateral jerk of the vehicle during cornering.

12. Method according to claim 1, wherein determining the first longitudinal acceleration target value comprises determining a seventh longitudinal acceleration target value being calculated on the basis of an predicted lateral acceleration of the vehicle at a preview point, which is located ahead of the controlled vehicle at a predetermined preview distance or at a preview distance which is calculated on the basis of a predetermined preview time and the current speed of the vehicle, the estimated lateral acceleration at a preview point being calculated on the basis of an estimation of curvature of the road at the preview point and the current speed of the controlled vehicle.

13. Method according to claim 11, wherein
the first longitudinal acceleration target value is determined based on the sixth longitudinal acceleration target value and the seventh longitudinal acceleration target value.

14. Apparatus for performing driving assistance for a controlled vehicle moving in a longitudinal direction on a road, comprising:
first longitudinal acceleration target value determining means for determining a first longitudinal acceleration target value on the basis of a lateral acceleration of the controlled vehicle,
second longitudinal acceleration target value determining means for determining a second longitudinal acceleration target value on the basis of a target speed of the controlled vehicle,
third longitudinal acceleration target value determining means for determining a third longitudinal acceleration target value based on a minimum value of the first longitudinal acceleration target value and the second longitudinal acceleration target value, and longitudinal acceleration control means for controlling a longitudinal acceleration of the controlled vehicle on the basis of the determined third longitudinal acceleration target value;

wherein determining the first longitudinal acceleration target value comprises determining a fourth longitudinal acceleration target value on the basis of a lateral acceleration of the controlled vehicle and adjusting the fourth longitudinal acceleration target value on the basis of at least one of:
a difference between an actual speed of the controlled vehicle and the target speed of the controlled vehicle,
a difference between an actual distance from the controlled vehicle to a proceeding vehicle and a target distance from the controlled vehicle to the proceeding vehicle,
a difference between a speed of the controlled vehicle and a speed of the proceeding vehicle, and
an estimated lateral acceleration of the controlled vehicle at a preview point of the road ahead of the controlled vehicle, the estimated lateral acceleration being calculated on the basis of an estimation of curvature of the road at the preview point and the current speed of the controlled vehicle.

15. A non-transitory computer program product comprising computer program means for causing a vehicle control apparatus to execute steps of:
determining a first longitudinal acceleration target value on the basis of a lateral acceleration of the controlled vehicle,
determining a second longitudinal acceleration target value on the basis of a target speed of the controlled vehicle,
determining a third longitudinal acceleration target value based on a minimum value of the first longitudinal acceleration target value and the second longitudinal acceleration target value, and
controlling a longitudinal acceleration of the controlled vehicle on the basis of the determined third longitudinal acceleration target value;

wherein determining the first longitudinal acceleration target value comprises determining a fourth longitudinal acceleration target value on the basis of a lateral acceleration of the controlled vehicle and adjusting the fourth longitudinal acceleration target value on the basis of at least one of:
a difference between an actual speed of the controlled vehicle and the target speed of the controlled vehicle,
a difference between an actual distance from the controlled vehicle to a proceeding vehicle and a target distance from the controlled vehicle to the proceeding vehicle,
a difference between a speed of the controlled vehicle and a speed of the proceeding vehicle, and
an estimated lateral acceleration of the controlled vehicle at a preview point of the road ahead of the controlled vehicle, the estimated lateral acceleration being calculated on the basis of an estimation of curvature of the road at the preview point and the current speed of the controlled vehicle.

* * * * *